United States Patent
Mizuo

(10) Patent No.: US 8,155,699 B2
(45) Date of Patent: Apr. 10, 2012

(54) COMMUNICATION APPARATUS

(75) Inventor: Yoshihiro Mizuo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 12/445,727

(22) PCT Filed: Aug. 20, 2008

(86) PCT No.: PCT/JP2008/065222
§ 371 (c)(1),
(2), (4) Date: Apr. 15, 2009

(87) PCT Pub. No.: WO2009/028516
PCT Pub. Date: Mar. 5, 2009

(65) Prior Publication Data
US 2010/0317403 A1    Dec. 16, 2010

(30) Foreign Application Priority Data

Aug. 27, 2007 (JP) ................................. 2007-219923
Aug. 27, 2007 (JP) ................................. 2007-219924

(51) Int. Cl.
*H04B 1/38* (2006.01)
(52) U.S. Cl. ................. 455/558; 455/435.1; 455/418
(58) Field of Classification Search .............. 455/558, 455/343.1, 556.1, 566, 343.2, 343.3, 411, 455/435.1, 435.2
See application file for complete search history.

(56) References Cited

U.S. PATENT DOCUMENTS

| | | | |
|---|---|---|---|
| 6,119,020 A * | 9/2000 | Miller et al. | 455/558 |
| 6,125,283 A * | 9/2000 | Kolev et al. | 455/552.1 |
| 6,185,436 B1 * | 2/2001 | Vu | 455/558 |
| 6,400,961 B1 | 6/2002 | Lillie et al. | |
| 7,085,569 B2 | 8/2006 | Ohmori | |
| 7,167,707 B1 * | 1/2007 | Gazzard et al. | 455/434 |
| 7,369,848 B2 * | 5/2008 | Jiang | 455/432.3 |
| 7,706,839 B2 * | 4/2010 | Ueno | 455/558 |
| 7,912,504 B2 * | 3/2011 | Bjorkner | 455/558 |
| 7,937,083 B2 * | 5/2011 | Oommen | 455/432.3 |
| 2006/0189312 A1 | 8/2006 | Kubo et al. | |

(Continued)

FOREIGN PATENT DOCUMENTS

CN          1610422          4/2005

(Continued)

OTHER PUBLICATIONS

Russian Office Action dated Oct. 8, 2010 issued in counterpart Russian Patent Application No. 2009132966/09.

(Continued)

*Primary Examiner* — Kamran Afshar
*Assistant Examiner* — Gerald Oliver
(74) *Attorney, Agent, or Firm* — Fitzpatrick, Cella, Harper & Scinto

(57) ABSTRACT

A communication apparatus comprises read-out means for reading out identification information from each of a plurality of storage media each storing identification information about a communication line; communication means for determining communication lines corresponding to the plurality of storage media based on the identification information read out from the plurality of storage media by the read-out means and performing communication with a base station using one of the plurality of determined communication lines; and control means for controlling the communication means to execute a search process of searching for a base station communicable with the communication means at an interval determined for each of the determined communication lines.

30 Claims, 24 Drawing Sheets

U.S. PATENT DOCUMENTS

2008/0064443 A1 * 3/2008 Shin et al. .................... 455/558

FOREIGN PATENT DOCUMENTS

| EP | 1240793 | B1 | 9/2002 |
| EP | 1152624 | B1 | 5/2005 |
| JP | 2001-169339 | A | 6/2001 |
| JP | 2003-189351 | A | 7/2003 |
| JP | 2003-189361 | A | 7/2003 |
| JP | 2004-187104 | A | 7/2004 |
| JP | 2006-60671 | A | 3/2006 |
| JP | 2006-128779 | A | 5/2006 |
| JP | 2006-237850 | A | 9/2006 |
| JP | 2006-340316 | A | 12/2006 |
| WO | 98/27766 | | 6/1998 |

OTHER PUBLICATIONS

Chinese Office Action dated May 24, 2011 issued in corresponding Chinese Patent Application No. 200880001306.1.

* cited by examiner

FIG. 7

| | |
|---|---|
| IC CARD ID | ~701 |
| INTERNATIONAL MOBILE TERMINAL NUMBER | ~702 |
|     MOBILE COMMUNICATION COUNTRY NUMBER | ~703 |
|     MOBILE COMMUNICATION NETWORK IDENTIFICATION NUMBER | ~704 |
|     MOBILE TERMINAL IDENTIFICATION NUMBER | ~705 |
| AUTHENTICATION KEY VALUE | ~706 |
| PIN CODE | ~707 |
|     PIN CODE 1 | ~708 |
|     PIN CODE 2 | ~709 |
| TELEPHONE BOOK | ~710 |
|     OUTGOING CALL DESTINATION FIXED TELEPHONE BOOK | ~711 |
| MAIL | ~712 |
| RESERVE | ~713 |

F I G. 8
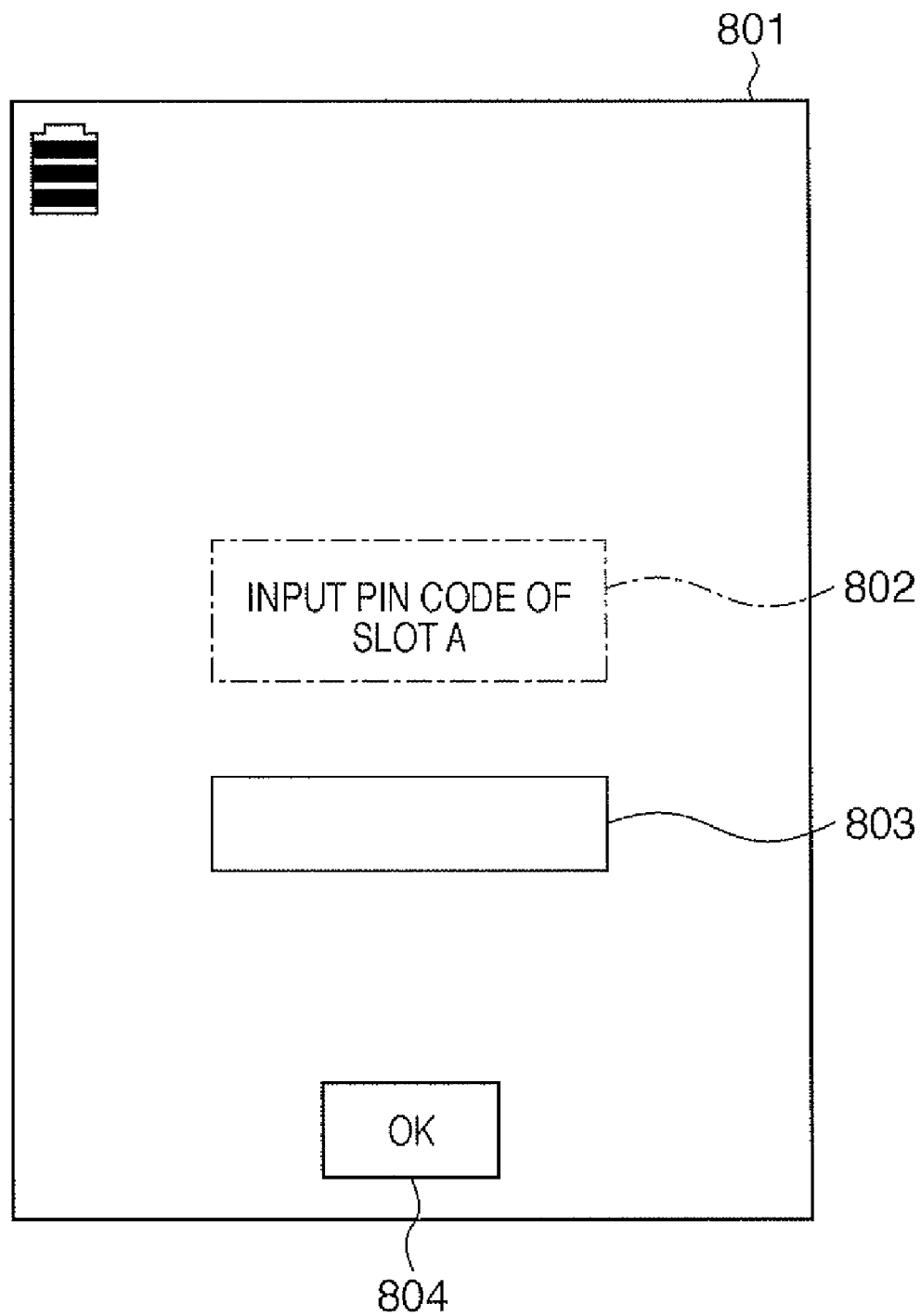

COMMUNICATION APPARATUS

This application is a National Stage application under 35 U.S.C. §371 of International Application No. PCT/JP2008/065222, filed on Aug. 20, 2008, which claims priority to Japanese Application Nos. 2007-219923, filed on Aug. 27, 2007, and 2007-219924, filed on Aug. 27, 2007, the contents of each of the foregoing applications being incorporated by reference herein.

TECHNICAL FIELD

The present invention relates to a communication apparatus and, more particularly, to an apparatus for performing communication using a plurality of communication lines.

BACKGROUND ART

Mobile telephones are conventionally known as portable communication apparatuses.

Especially, for an IMT-2000 telephone among the mobile telephones, an IC card called a SIM (Subscriber Identification Module) card is distributed to each user.

Each SIM card stores subscriber identification information such as the telephone (subscriber) number and carrier (the carrier for which the user has signed up, and its communication method) of each sign-up for a line. When the SIM card is attached to the telephone, and the identification information is read out from the SIM card, the user can perform communication based on an outgoing call or incoming call. The user can also selectively use a plurality of telephones by exchanging the SIM card to be attached to a telephone.

When one user has signed up for a plurality of communication lines, SIM cards each storing identification information for one communication line are provided. Hence, the user can selectively use the plurality of communication lines in one telephone by exchanging the SIM card to be attached to the telephone.

A telephone to which two SIM cards are attachable has also been proposed (e.g., Japanese Patent Laid-Open No. 2003-189351). When a user has signed up for two lines and received two SIM cards, he/she can perform communications using the two lines in one telephone.

A mobile telephone of this type executes cell search at the time of power-on to search for a communicable radio base station and register the position. When the mobile telephone moves out of a zone where it can communicate with a radio base station, the telephone periodically executes cell search and, upon returning into the zone, quickly shifts to the standby state.

As described above, if the cell search execution interval of the mobile telephone is set long outside the zone, the shift to the standby state in returning into the zone is delayed. On the other hand, if the cell search interval is short, the base station search process is frequently executed, resulting in an increase in battery consumption of the mobile telephone.

Especially, in a mobile telephone attached with a plurality of SIM cards and capable of communicating using a plurality of carriers, as described in Japanese Patent Laid-Open No. 2003-189351, it is necessary to execute cell search and position registration as many as the carriers to be used.

This further increases power consumption as compared to a conventional mobile telephone that uses only one carrier.

DISCLOSURE OF INVENTION

The present invention has been made in consideration of the above situation, and has as its object to provide an apparatus capable of suppressing power consumption even when using a plurality of communication lines.

According to the present invention, the foregoing object is attained by providing a communication apparatus characterized by comprising: read-out means for reading out identification information from each of a plurality of storage media each storing identification information about a communication line; communication means for determining communication lines corresponding to the plurality of storage media based on the identification information read out from the plurality of storage media by the read-out means and performing communication with a base station using one of the plurality of determined communication lines; and control means for controlling the communication means to execute a search process of searching for a base station communicable with the communication means at an interval determined for each of the determined communication lines.

According to the present invention, the foregoing object is also attained by providing a communication apparatus characterized by comprising: read-out means for reading out identification information from each of a plurality of storage media each storing identification information about a communication line; communication means for determining communication lines corresponding to the plurality of storage media based on the identification information read out from the plurality of storage media by the read-out means and performing communication with a base station using one of the plurality of determined communication lines; and control means for controlling the communication means to execute a search process of searching for a communicable base station at an interval determined for each of the plurality of communication lines and set a standby state for an incoming call based on a result of the search, wherein the control means sets the interval of the search process to be executed by the communication means in accordance with the number of communication lines in the standby state.

Further, according to the present invention, the foregoing object is also attained by providing a communication apparatus characterized by comprising: read-out means for reading out identification information from each of a plurality of storage media each storing identification information about a communication line; communication means for determining communication lines corresponding to the plurality of storage media based on the identification information read out from the plurality of storage media by the read-out means and performing communication with a base station using one of the plurality of determined communication lines; and control means for controlling the communication means to execute a search process of searching for a communicable base station at an interval determined for each of the plurality of communication lines and set a standby state for an incoming call based on a result of the search, wherein when one of the plurality of communication lines is set in the standby state, the control means prolongs the interval of the search process to be executed for a communication line that is not set in the standby state.

Further features of the present invention will become apparent from the following description of exemplary embodiments with reference to the attached drawings.

BRIEF DESCRIPTION OF DRAWINGS

FIGS. 5A and 5B are flowcharts illustrating the operation of the mobile telephone according to the embodiment of the present invention at the time of power-on;

FIG. 7 is a view showing identification information stored on a SIM card of the mobile telephone according to the embodiment of the present invention;

FIG. 8 is a view showing an example of a PIN code input window of the mobile telephone according to the embodiment of the present invention;

FIG. 9 is a flowchart illustrating the cell search process of a mobile telephone according to a first embodiment of the present invention at the time of power-on;

BEST MODE FOR CARRYING OUT THE INVENTION

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 2:
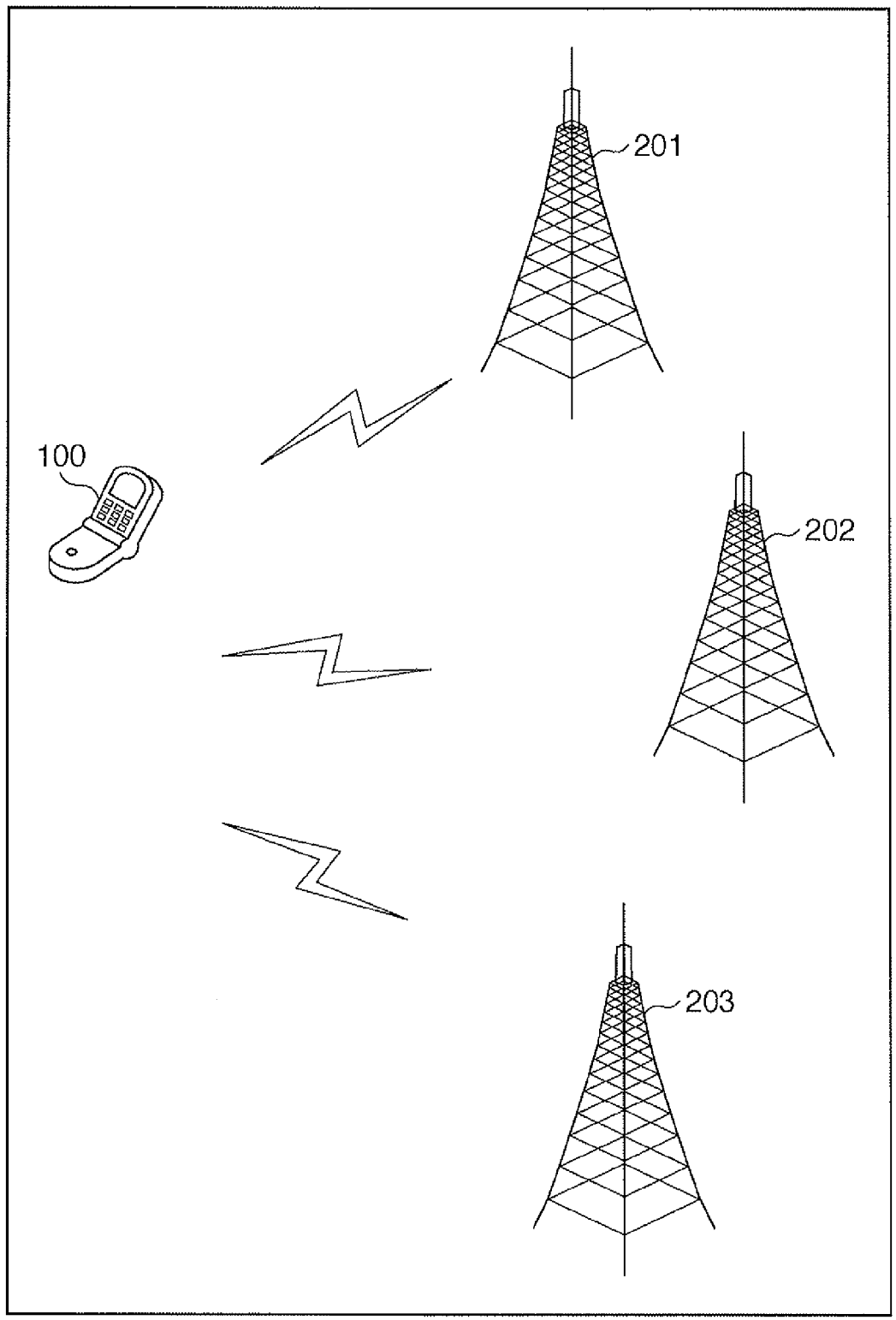
FIG. 2 is a view showing the arrangement of a system in which the mobile telephone according to the embodiment of the present invention is used.

FIG. 2 is a view showing the arrangement of a system in which a mobile telephone according to an embodiment of the present invention is used.

A mobile telephone (to be referred to as a telephone hereinafter) 100 is of cellular type. More specifically, the telephone 100 makes an outgoing call or incoming call via radio base stations 201 to 203 installed in a plurality of cells. As is known, the telephone 100 searches the radio base stations 201 to 203 for a radio base station to be used for communication. Then, the telephone performs communication via the radio base station detected by search.

The telephone 100 will be described next.

Figure 1:
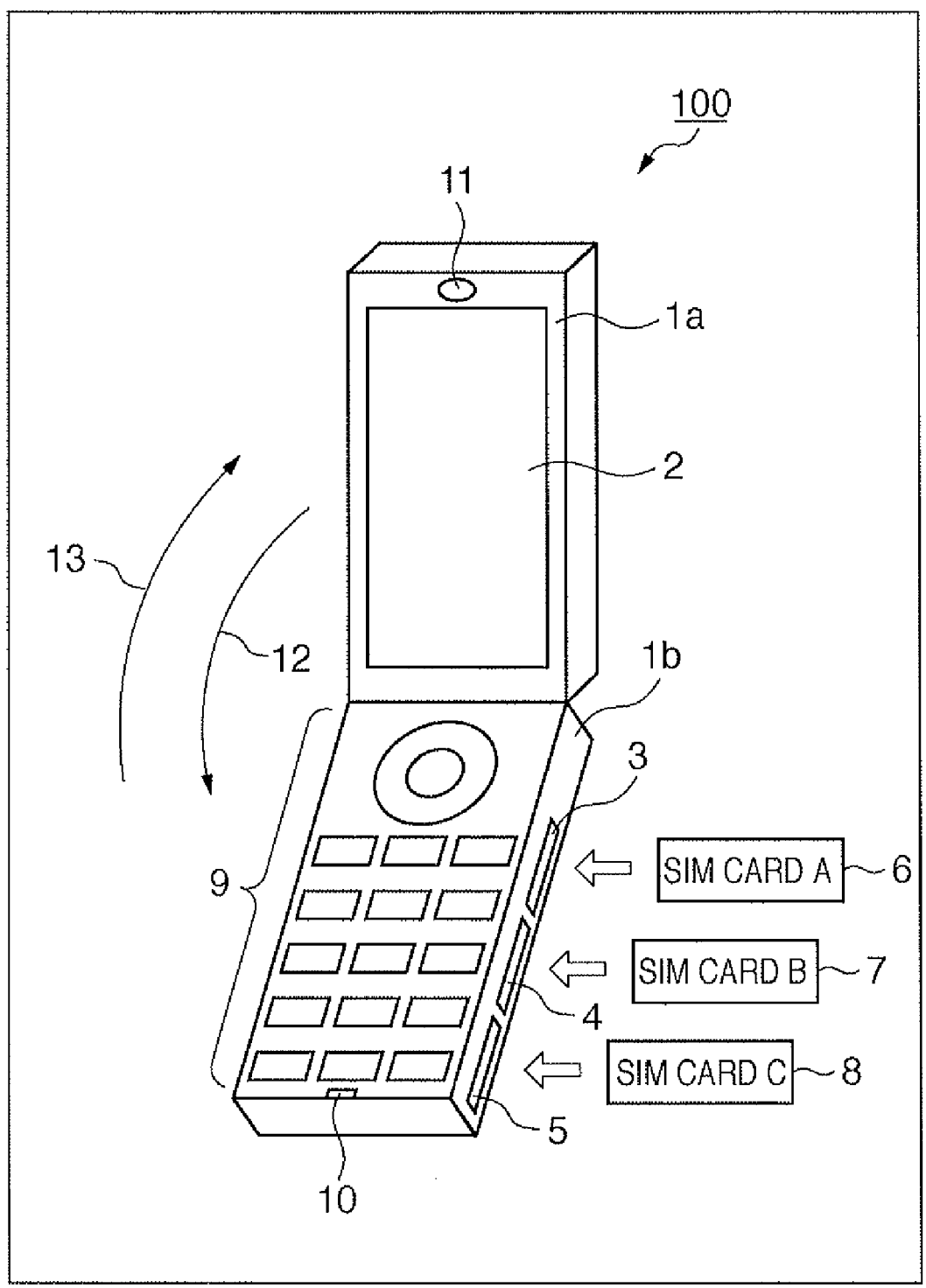
FIG. 1 is a view showing the outer appearance of a mobile telephone according to an embodiment of the present invention.

FIG. 1 is a view showing the outer appearance of the telephone 100 according to the embodiment of the present invention.

The telephone 100 in FIG. 1 can perform communication using a plurality of different communication methods. In this embodiment, the telephone can perform communication using the W-CDMA method and the CDMA2000 method. Any communication method other than them or three or more communication methods may be used for communication, as a matter of course.

In addition to a voice communications function, the telephone 100 has a multimedia function such as videophone communication, an e-mail sending/receiving function, and a WEB browsing function. The mobile telephone 100 also has a telephone book function, an electronic organizer function, a function of downloading and using an application such as a game, a navigation function, and a music playback function.

Cases 1a and 1b of the telephone 100 incorporate an antenna and a vibrator which vibrates upon receiving an incoming call. The case 1a has a liquid crystal display unit (LCD) 2. A speaker 11 is arranged on the upper side of the display unit 2.

The telephone 100 has three slots 3, 4, and 5 to which SIM cards are attached. Different SIM cards 6, 7, and 8 are attachable to the SIM slots 3, 4, and 5. SIM cards A 6, B 7, and C 8 are freely detachable.

A microphone 10 for inputting voice in communication is arranged at the lowermost portion of the case 1b. A key operation unit 9 for inputting operations associated with not only the communications function but also various other functions is provided at the lower part of the case 1b.

The telephone 100 can pivot the cases 1a and 1b in the direction of an arrow 12 or 13. When the case 1a of the telephone 100 in the open state is pivoted in the direction of the arrow 12 with respect to the case 1b, the telephone can be folded. When the telephone 100 is folded, the display unit 2 is located inside the telephone. When the case 1a of the telephone 100 in the folded state is pivoted in the direction of the arrow 13 with respect to the case 1b, the telephone can be opened.

The user can use various kinds of functions by operating the key operation unit 9 of the telephone 100 in the open state. An incoming call or mail can be received even in the folded state of the telephone 100.

Figure 3:
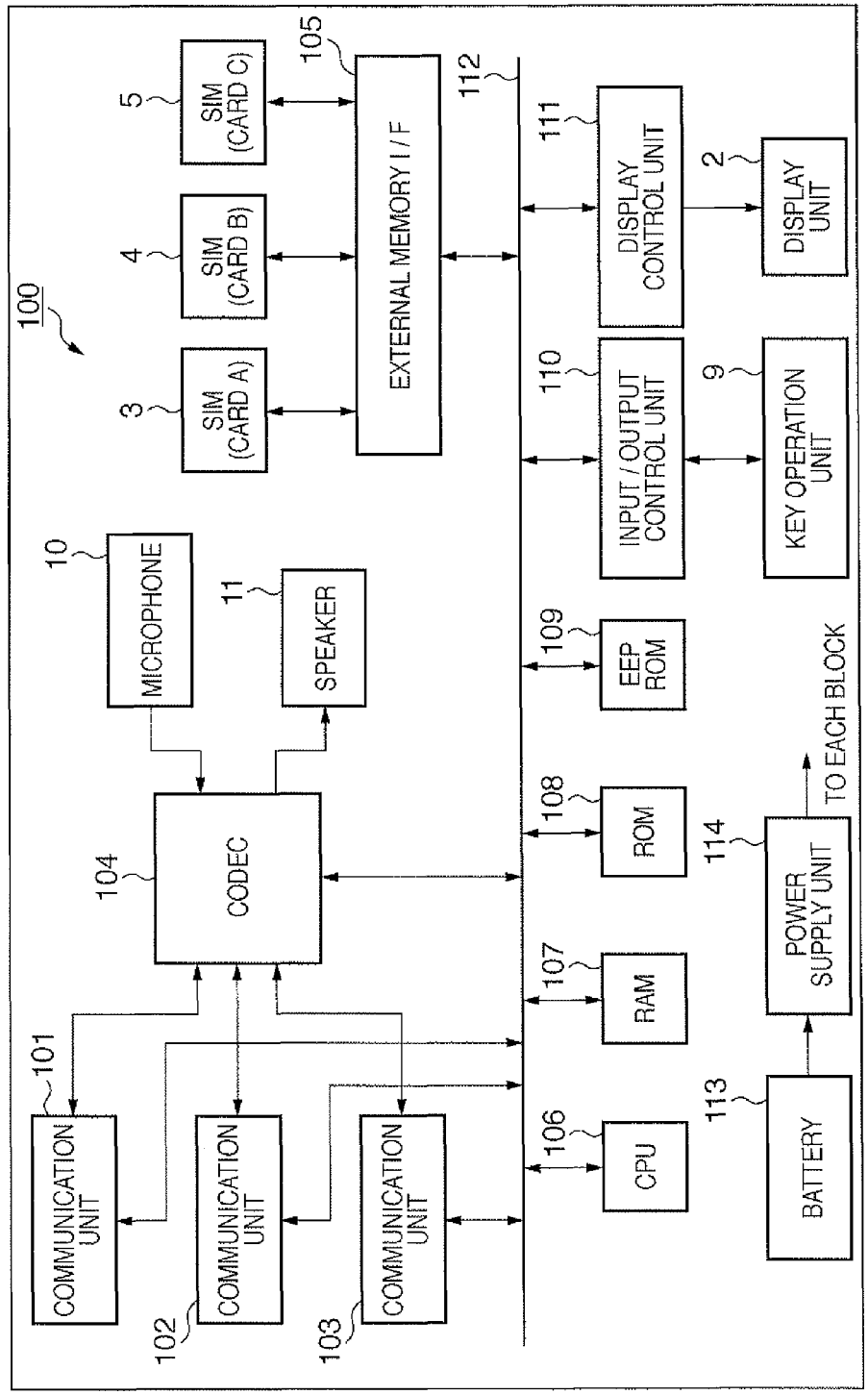
FIG. 3 is a block diagram showing the arrangement of the mobile telephone according to the embodiment of the present invention.

FIG. 3 is a block diagram showing the internal arrangement of the telephone 100 in FIG. 1. The block diagram of FIG. 3 illustrates only blocks mainly necessary for the communications function and the e-mail sending/receiving function. As described above, the telephone 100 has various functions in addition to the communications function and the e-mail sending/receiving function. Blocks associated with these functions can use a known arrangement, and a detailed description thereof will be omitted.

Referring to FIG. 3, a CPU 106 controls various kinds of operations of the telephone 100. The CPU 106 controls the units via a CPU bus 112. A RAM 107 and a ROM 108 which store data and programs, and an EEPROM 109 which is a nonvolatile memory capable of holding data even after power-off are connected to the CPU bus 112.

The CPU 106 executes control via an input/output control unit 110 to receive key input from the key operation unit 9 and make its buttons glow. The CPU 106 also controls a display control unit 111 to display various images and information on the display unit 2.

The CPU 106 reads out information from SIM cards attached to the SIM slot (A) 3, SIM slot (B) 4, and SIM slot (C) 5 via an external memory I/F 105.

A battery 113 is chargeable. A power supply unit 114 supplies power from the battery 113 to the units of the telephone 100.

The telephone 100 includes communication units 101 and 102 for the W-CDMA method (first communication method) and a communication unit 103 for the CDMA2000 method (second communication method). The telephone selects one of the communication units 101, 102, and 103 in accordance with subscriber information read out from the attached SIM cards A 6 to C 8 and performs communication, as will be described later. More specifically, if the attached SIM card supports the W-CDMA method, one of the communication units 101 and 102 is selected for communication. If the SIM card supports the CDMA2000 method, the communication unit 103 is selected for communication. In this embodiment, communication can be performed while simultaneously attaching two SIM cards supporting the W-CDMA method. Additionally, in this embodiment, communication can be performed while simultaneously attaching two SIM cards supporting the W-CDMA method and one SIM card supporting the CDMA2000 method.

The telephone can execute an outgoing call process and an incoming call process by transmitting identification information read out from a SIM card to the control apparatus of the wireless network via a radio base station.

The basic telephone call/e-mail receiving/sending process of the telephone 100 will be described next.

Figure 4:
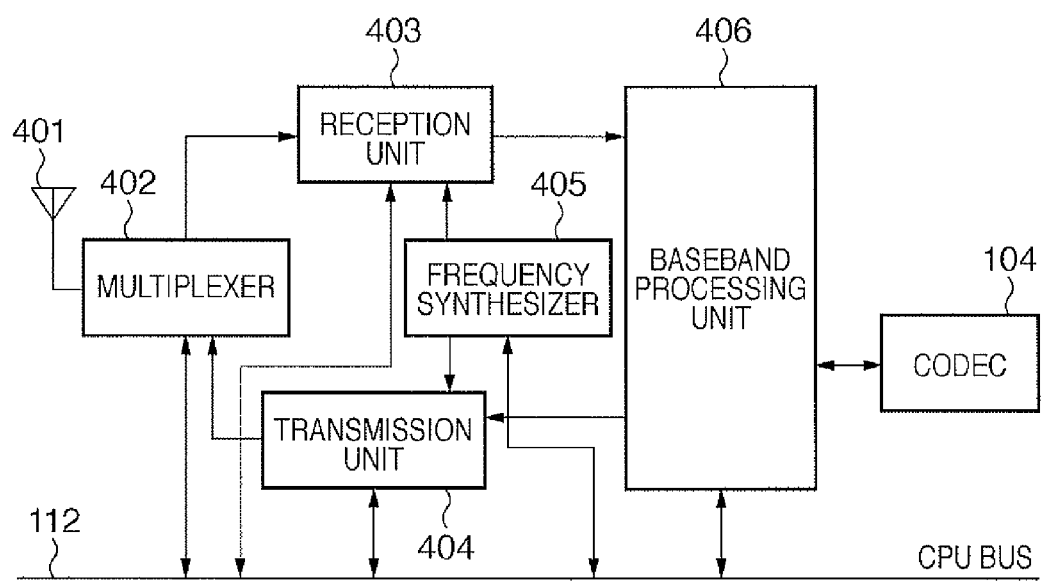
FIG. 4 is a block diagram showing the arrangement of a communication unit of the mobile telephone according to the embodiment of the present invention.

As an example, the process of the communication unit 101 upon receiving an incoming call will be explained. FIG. 4 is a block diagram showing the arrangement of the main part of each of the communication units 101 to 103. The communication units 101 to 103 include identical functional blocks. Referring to FIG. 4, the CPU 106 controls, via the CPU bus 112, a multiplexer 402, reception unit 403, transmission unit 404, frequency synthesizer 405, and baseband processing unit 406.

In the standby state for an incoming call, an antenna 401 receives a signal of a specific control channel transmitted from a base station shown in FIG. 2. The received signal is input to the reception unit 403 via the multiplexer 402. The reception unit 403 includes a high-frequency amplifier, frequency converter, and demodulator. The reception unit 403 causes a low-noise amplifier to low-noise-amplify the received signal, mixes it with a reception local oscillation signal generated by the frequency synthesizer 405, and frequency-converts the signal into a reception intermediate frequency signal or reception baseband signal. The demodulator demodulates the frequency-converted signal.

The demodulated signal is sent to the baseband processing unit 406 and separated into control data, voice signal, and e-mail data. The control data is sent to the CPU 106. The CPU 106 detects the incoming call in accordance with the control data. Upon detecting the incoming call, a signal of a specific channel is received, and the baseband processing unit 406 detects voice data.

After the incoming call, the baseband processing unit 406 detects the voice data and sends it to a codec 104. The codec 104 decodes the voice signal in accordance with the communication method and outputs it from the speaker 11.

On the other hand, e-mail data is sent to and stored on the RAM 107. The user can arbitrarily read out the e-mail data from the RAM 107 and display it on the display unit 2 by operating the key operation unit 9.

In this way, upon receiving an incoming call of voice telephone, the speaker 11 outputs the partner's voice.

On the other hand, to transmit voice during communication, the codec 104 encodes the user's voice signal output from the microphone 10 in accordance with the communication method. The encoded voice data undergoes a necessary process by the baseband processing unit 406 and is output to the transmission unit 404. The transmission unit 404 includes a modulator, frequency converter, and transmission power amplifier. The transmission unit 404 modulates the voice data in accordance with the communication method, mixes it with a transmission local oscillation signal generated by the frequency synthesizer 405, and frequency-converts the signal into a radio frequency signal. The converted signal is amplified and transmitted to a base station (not shown) via the multiplexer 402 and the antenna 401.

The user can finish the communication by operating the key operation unit 9.

A process for an outgoing call will be described next.

The user inputs the partner's telephone number and instructs an outgoing call by operating the key operation unit 9. Upon receiving the outgoing call instruction, the CPU 106 sends data for the outgoing call to the baseband processing unit 406. The baseband processing unit 406 first sends data for an outgoing call request to the transmission unit 404. The transmission unit 404 modulates, frequency-converts, and amplifies the outgoing call request data, as described above, and transmits the data to a base station using a channel designated by the multiplexer 402 and antenna 401.

After transmitting the outgoing call request, the CPU 106 detects based on control data transmitted from the base station whether the channel is connected to the partner. Confirming the channel connection to the partner, a process of receiving the partner's voice data and transmitting the user's voice is executed, as in the above-described incoming call process.

To send e-mail, the user instructs mail creation using the key operation unit 9. Upon receiving the mail creation instruction, the CPU 106 controls the display control unit 111 to display a mail creation window on the display unit 2. The user inputs the sending destination and text and instructs sending using the key operation unit 9. Upon receiving the mail sending instruction, the CPU 106 sends address information to the baseband processing unit 406 and the text data to the codec 104. The codec 104 encodes the text data and sends it to the baseband processing unit 406.

The baseband processing unit 406 sends the address and text data to the transmission unit 404. The transmission unit 404 executes a process such as modulation and transmits the data to a base station via the multiplexer 402 and antenna 401.

The multiplexer 402 also detects the intensity of a radio field transmitted from a base station and sends the detection result to the CPU 106 via the CPU bus 112.

In this embodiment, subscriber identification information is read out from SIM cards attached to the SIM slot (A) 3, SIM slot (B) 4, and SIM slot (C) 5, and a communication process is performed based on the subscriber identification information.

Information stored on a SIM card will be described.

FIG. 7 is a view showing information stored on a SIM card.

Each SIM card stores an IC card ID 701, international mobile terminal number 702, authentication key value 706, PIN code 707, telephone book information 710, mail data 712, and reserve 713.

The IC card ID 701 is information to uniquely identify the card. The international mobile terminal number 702 is information provided by the carrier, for which the user has signed up, to specify the subscriber. The international mobile terminal number 702 includes a mobile communication country number 703, mobile communication network identification number 704, and mobile terminal identification number 705. The mobile communication country number 703 enables to determine the country of the carrier for which the user has signed up. The mobile communication network identification number 704 enables to identify the carrier for which the user has signed up. The mobile terminal identification number 705 is provided to the subscriber as a telephone number.

The authentication key value 706 is information used for authentication of the telephone to access the telephone network provided by the carrier. The PIN (Personal Identification Number) code 707 is an authentication code which specifies the user when a SIM card is attached to the telephone, thereby preventing any unauthorized third party from using the telephone. The SIM card can store two kinds of PIN codes.

The telephone book 710 includes an outgoing call destination fixed telephone book 711 for which an outgoing call is allowed by inputting a PIN code 709.

A SIM card detection and authentication process upon power-on will be described next with reference to the flowcharts in FIGS. 5A and 5B.

In the telephone 100 of this embodiment, the user cannot remove the SIM card from the SIM slot during power-on. If the user wants to attach or eject the SIM card, the telephone 100 needs to be powered off.

After ejecting or attaching the SIM card during power-off, the user powers on the telephone by operation the key operation unit 9. Then, the flowchart in FIG. 5A starts. The processes in FIGS. 5A and 5B are executed by causing the CPU 106 to control the units.

First, the CPU determines whether a SIM card is attached to the SIM slot (A) 3 (step S501). If a SIM card is attached to the SIM slot 3, the CPU reads out subscriber information as shown in FIG. 7 from the SIM card via the SIM slot 3 and stores it in the RAM 107 (step S502).

Next, the CPU determines whether a SIM card is attached to the SIM slot (B) 4 (step S503). If a SIM card is attached to the SIM slot 4, the CPU reads out subscriber information as shown in FIG. 7 from the SIM card via the SIM slot 4 and stores it in the RAM 107 (step S504).

Then, the CPU determines whether a SIM card is attached to the SIM slot (C) 5 (step S505). If a SIM card is attached to the SIM slot 5, the CPU reads out subscriber information as shown in FIG. 7 from the SIM card via the SIM slot 5 and stores it in the RAM 107 (step S506).

Next, the authentication process of the SIM card A 6 attached to the SIM slot 3 is executed (S507).

Figure 6:
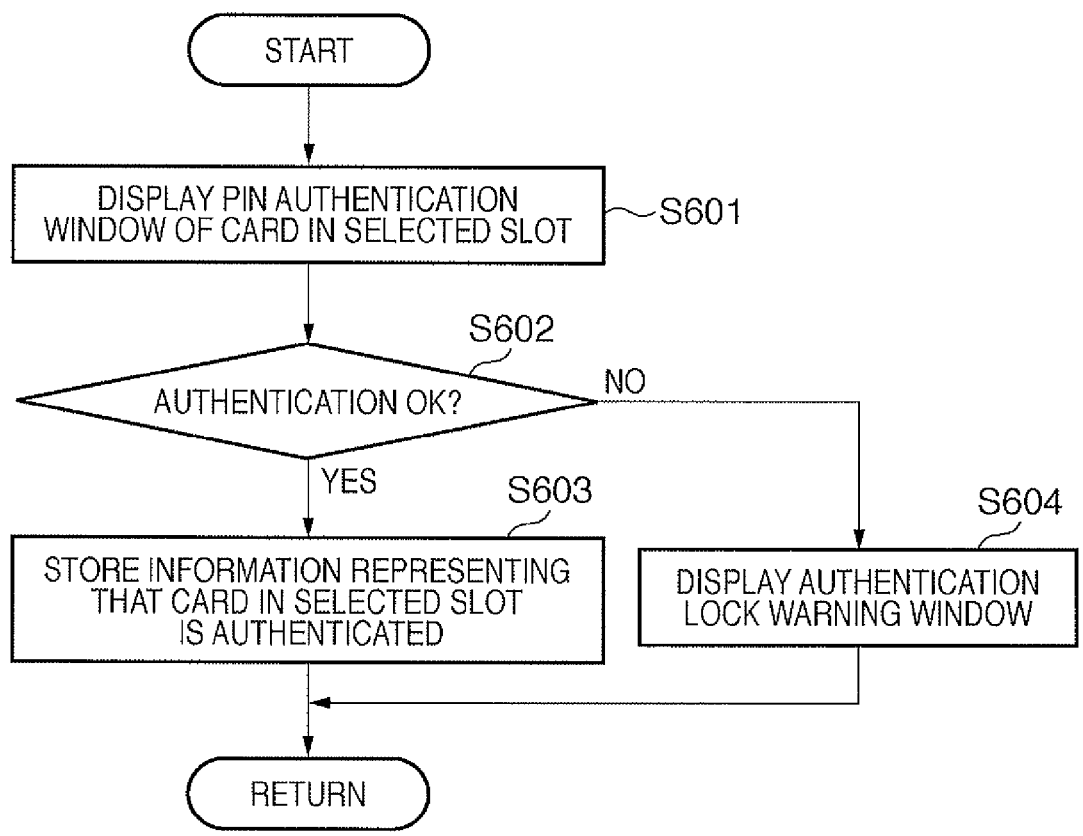
FIG. 6 is a flowchart illustrating the authentication process of the mobile telephone according to the embodiment of the present invention.

The authentication process in step S507 will be described with reference to the flowchart in FIG. 6.

First, the PIN code authentication window of the card of the selected slot, and in this case, the SIM card A 6 attached to the SIM slot 3 is generated and displayed on the display unit 2 (step S601). FIG. 8 is a view showing a PIN code input window.

A display window 801 of the display unit 2 displays a message 802 to prompt the user to do input. The user inputs a PIN code to an input field 803 using the key operation unit 9. Reference numeral 804 denotes a determination cursor.

When the PIN code input window is displayed, and the user inputs the PIN code, the CPU determines whether the input code matches the PIN code read out from the SIM card A 6 (step S602). If the PIN codes match, and authentication has succeeded, information representing that the SIM card A 6 is already authenticated is stored in the RAM 107 (step S603). On the other hand, if authentication has failed, a window indicating that authentication has failed, and communication using the SIM card A 6 is impossible is displayed on the display unit 2 (step S604).

When the authentication process of the SIM card A 6 attached to the SIM slot 3 is thus completed, the authentication process of the SIM cards B 7 and C 8 attached to the SIM slots 4 and 5 is executed subsequently (steps S508 and S509).

The communication line to be used is determined based on the identification information of the authenticated SIM card. Of the communication units 101 to 103, a communication unit which should perform communication using the communication line of a SIM card is determined in correspondence with each SIM card.

Additionally, the information of an application program set for each line for which the user has signed up is read out from the ROM 108 based on the identification information. Furthermore, user information including a wallpaper and address information is read out from the EEPROM 109. The pieces of readout information are stored in the RAM 107 (step S528).

Figure 5A:
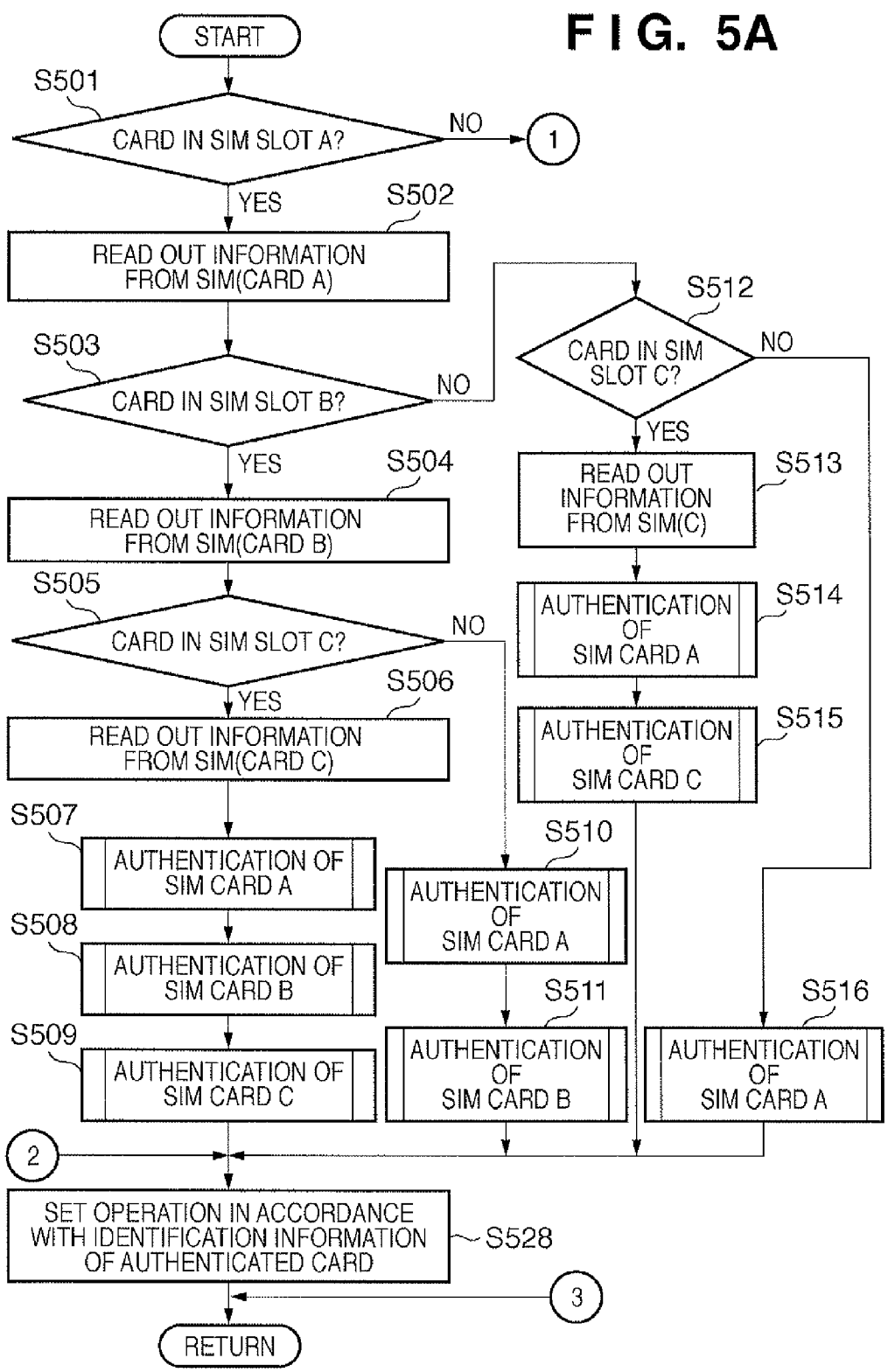
Figure 5B:
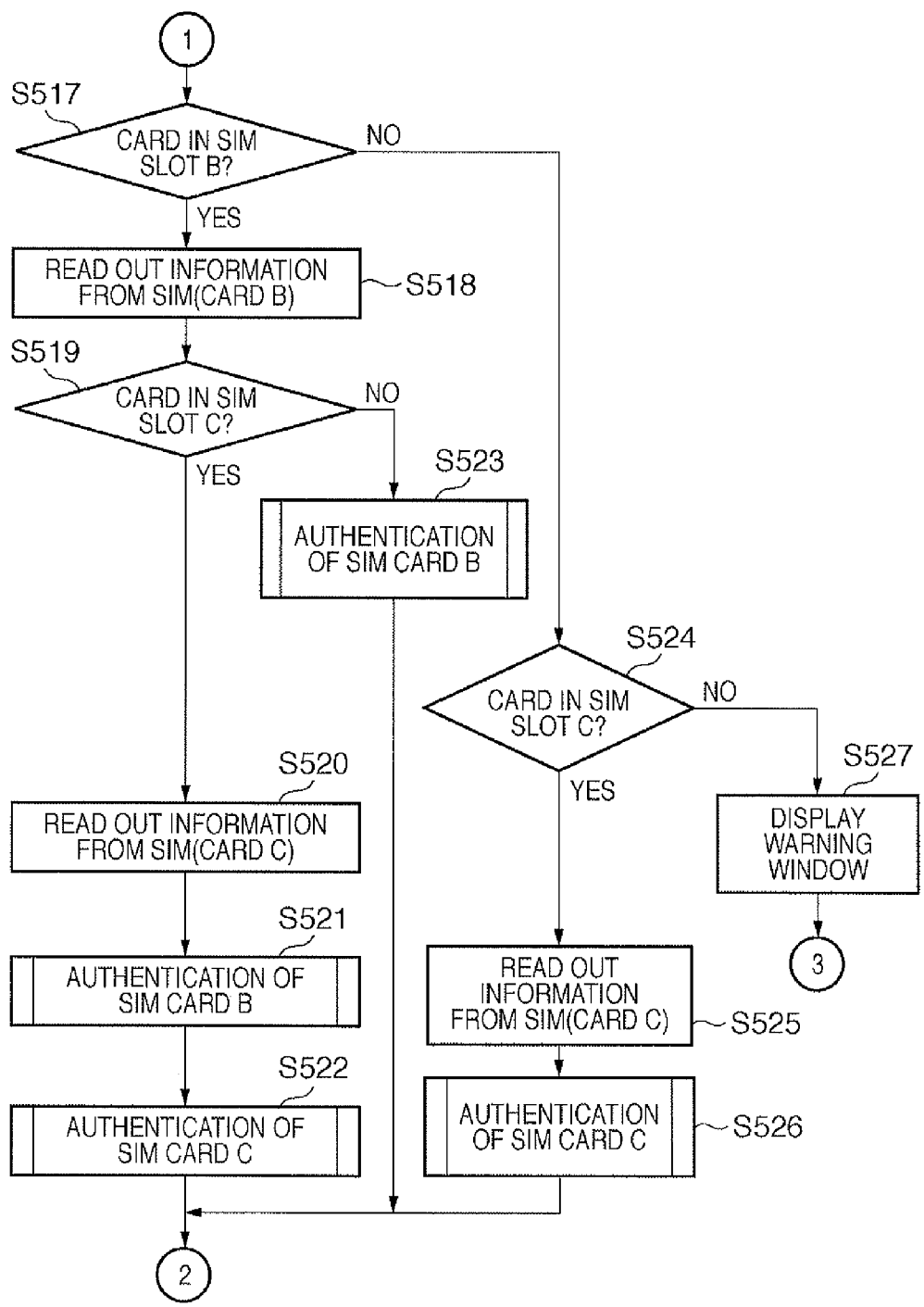

If no SIM card is attached to the SIM slot 5 in step S505 of FIG. 5A, the authentication process of the SIM cards A 6 and B 7 is executed (steps S510 and S511).

If no SIM card is attached to the SIM slot 4 in step S503, the CPU determines whether a SIM card is attached to the SIM slot 5 (step S512). If a SIM card is attached to the SIM slot 5, identification information is read out from the attached SIM card C 8 (step S513). Then, the authentication process of the SIM cards A 6 and C 8 is executed (steps S514 and S515).

If no SIM card is attached to the SIM slot 5 in step S512, the authentication process of the SIM card A 6 is executed (step S515).

If no SIM card is attached to the SIM slot 3 in step S501, the CPU determines whether a SIM card is attached to the SIM slot 4 (step S517). If a SIM card is attached to the SIM slot 4, subscriber information is read out from the SIM card B 7 via the SIM slot 4 and stored in the RAM 107 (step S518).

Next, the CPU determines whether a SIM card is attached to the SIM slot 5 (step S519). If a SIM card is attached to the SIM slot 5, subscriber information is read out from the SIM card C 8 via the SIM slot 5 and stored in the RAM 107 (step S520). The authentication process of the SIM cards B 7 and C 8 is then executed (steps S521 and S522).

If no SIM card is attached to the SIM slot 5 in step S519, the authentication process of the SIM card B 7 is executed (step S523).

If no SIM card is attached to the SIM slot 4 in step S517, the CPU determines whether a SIM card is attached to the SIM slot 5 (step S524). If a SIM card is attached to the SIM slot 5, subscriber information is read out from the SIM card C 8 via the SIM slot 5 and stored in the RAM 107 (step S525). Then, the authentication process of the SIM card C 8 is executed (step S526).

If no SIM card is attached to the SIM slot 5 either in step S524, information representing that no SIM card is attached is displayed on the display unit 2, and the process returns to a preset process (step S527). In this embodiment, if no SIM card is attached, not the function using the communication units 101 to 103 but other functions are usable.

In this way, upon power-on, the authentication process is executed in accordance with identification information read out from the SIM cards attached to the SIM slots 3, 4, and 5.

<First Embodiment>

A cell search process upon powering on a telephone 100 according to the first embodiment will be described next.

A telephone which performs communication using the W-CDMA method or CDMA2000 method searches for a communicable base station from radio base stations that cover a number of cells included in each position registration area. Position registration is done via the base station detected by the search.

In the telephone 100 of the first embodiment, after power-on, the cell search operation is executed subsequent to a SIM card authentication process, as described above.

Figure 9:
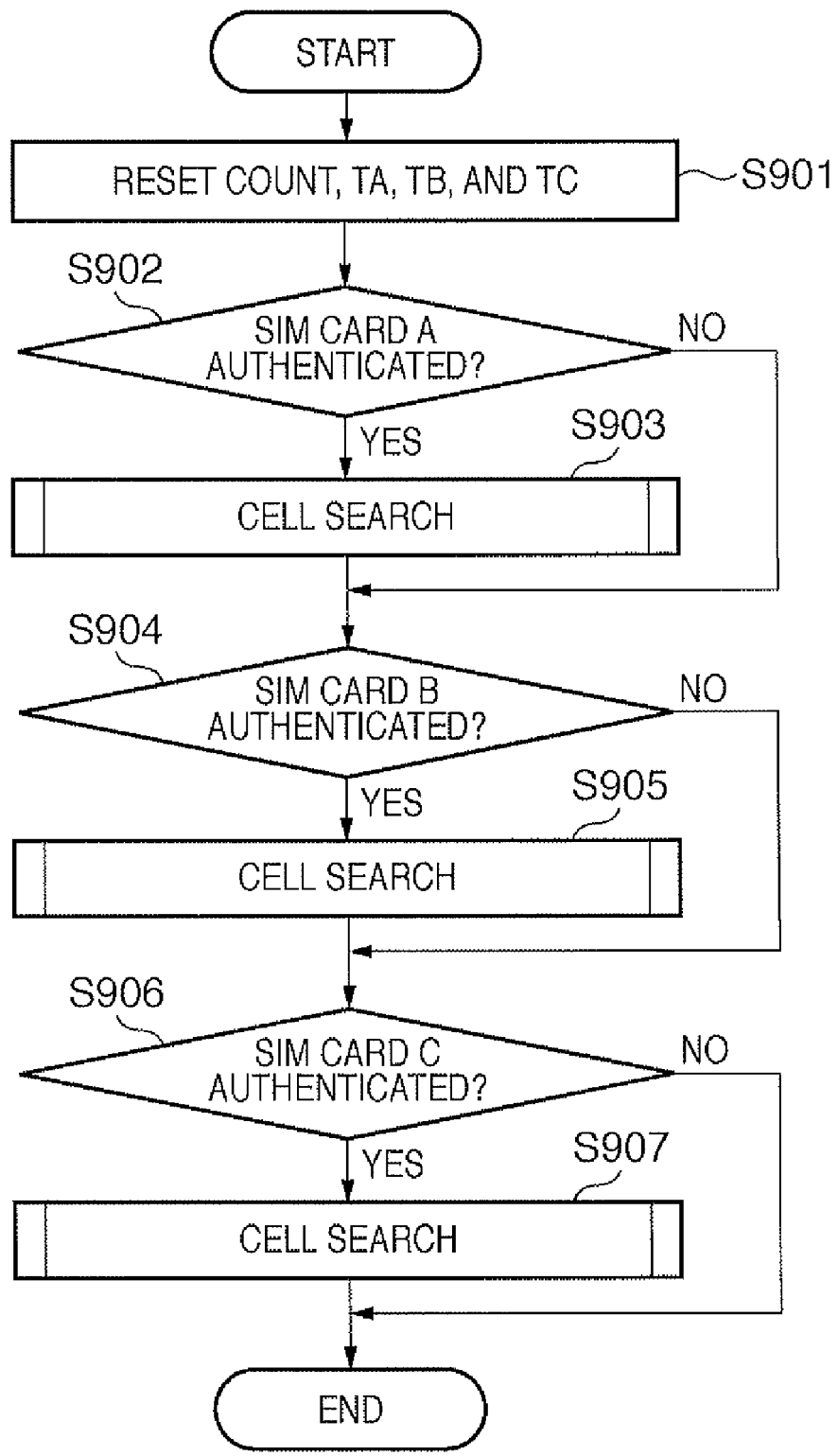

FIG. 9 is a flowchart illustrating a cell search process executed upon power-on. Note that a CPU 106 executes the process in FIG. 9.

First, the CPU resets a count value COUNT of an internal counter and variables TA, TB, and TC (step S901). TA, TB, and TC are variables to decide the execution intervals of the cell search process for communication lines determined by SIM cards A 6, B 7, and C 8.

The CPU determines whether the SIM card A 6 is already authenticated (step S902). If the SIM card is not authenticated yet (including a case in which the SIM card A 6 is not attached), the process advances to step S904. If the SIM card is already authenticated, the process advances to the cell search process (step S903).

The cell search process will be described with reference to the flowchart in FIG. 10. The cell search process for a communication line corresponding to the SIM card A 6 will be described in FIG. 10. The cell search process for communication lines corresponding to the remaining SIM cards can be executed in the same way using the variables TB and TC in place of the variable TA.

After power-on, the CPU determines whether it is the first cell search process (step S1001). Since it is the first cell search process here, the process advances to step S1003 to determine the radio field intensity from each base station in the neighborhood.

As described above, the multiplexer of each of communication units 101 to 103 measures the value of radio field intensity and outputs the value to the CPU 106. The CPU 106 detects the radio field intensity output from the communication unit corresponding to a selected SIM card.

If the radio field intensity is more than a threshold value, the communication unit corresponding to the selected SIM card searches for a communicable one of the radio base stations in the neighborhood (step S1004).

The CPU determines whether a base station is detected by the search (step S1005). If a base station is detected, communication with the base station is performed, and a position registration process is executed using a known technique (step S1006). The standby state is set for the communication line corresponding to the selected SIM card, and information representing it is stored in a RAM 107 (step S1007).

On the other hand, if the radio field intensity is equal to or less than the threshold value in step S1003, or no base station is detected in step S1005, the CPU detects a priority set for the selected SIM card (step S1008), as will be described later.

If the priority is high, the interval to the next cell search execution is set to T1. T1 is added to the current count value COUNT and set in TA (step S1009).

If the set priority is low in step S1008, the interval to the next cell search execution is set to T2 longer than T1. T2 is added to COUNT and set in TA (step S1010).

Referring back to FIG. 9, after the cell search process of the SIM card A 6 is completed, the CPU determines whether the SIM card B 7 is already authenticated (step S904). If the SIM card is not authenticated yet (including a case in which the SIM card B 7 is not attached), the process advances to step S905. If the SIM card is already authenticated, the process advances to the cell search process concerning the SIM card B 7 in FIG. 10 (step S905). In steps S1009 and S1010 in FIG. 10, TB is used in place of TA.

After the cell search process of the SIM card B 7 is completed, the CPU determines whether the SIM card C 8 is already authenticated (step S906). If the SIM card is not authenticated yet (including a case in which the SIM card C 8 is not attached), the process is ended. If the SIM card is already authenticated, the process advances to the cell search process concerning the SIM card C 8 in FIG. 10 (step S907). In steps S1009 and S1010 in FIG. 10, TC is used in place of TA.

The priority setting process will be explained next.

In the first embodiment, the user can arbitrarily set the priority of the cell search process for the communication lines determined by the attached SIM cards. The cell search execution interval is set to be shorter for a communication line with a high priority than a communication line with a low priority.

Figure 13:
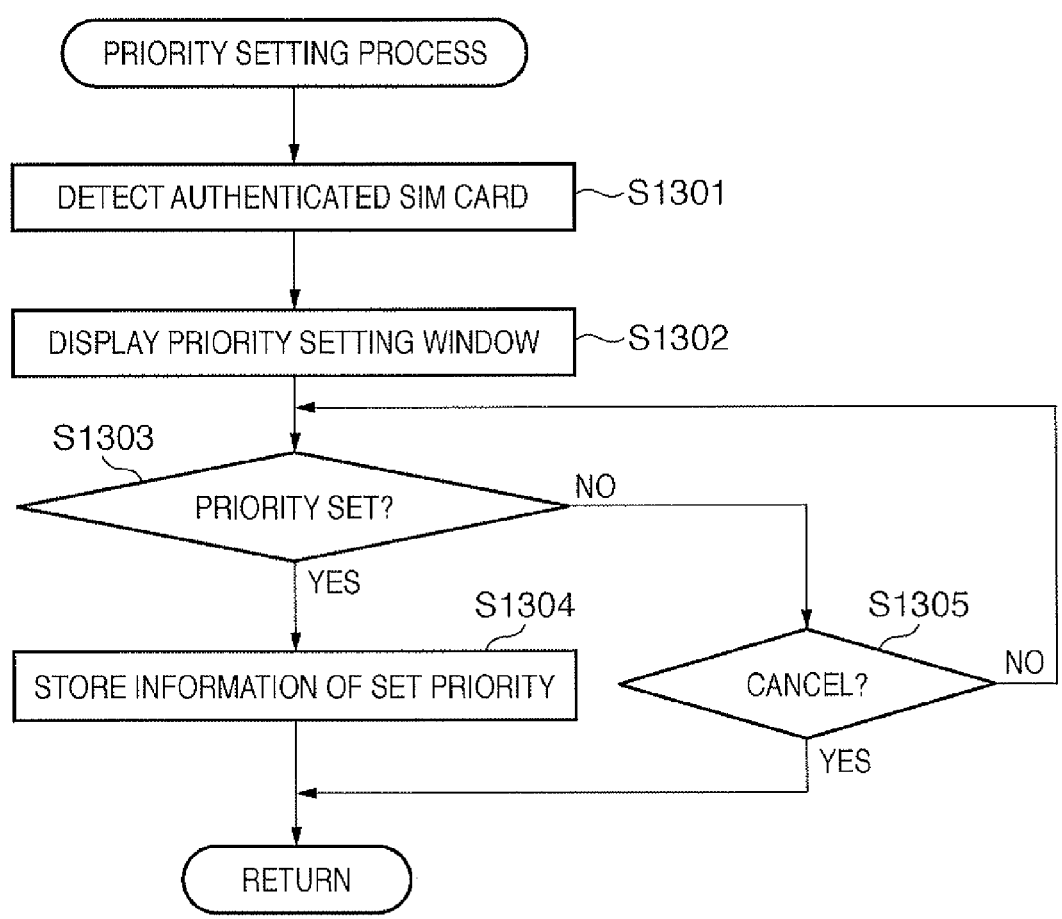
FIG. 13 is a flowchart illustrating a priority setting process according to the first embodiment of the present invention.

FIG. 13 is a flowchart illustrating the priority setting process according to the first embodiment.

When the user displays a menu window on a display unit 2 by operating a key operation unit 9, and selects a priority setting item on the menu window, the sequence in FIG. 13 starts. The CPU 106 executes the process in FIG. 13.

When the user inputs the priority setting instruction, the CPU detects an authenticated one of SIM cards attached to SIM slots 3, 4, and 5 (step S1301). The CPU displays a setting window on the display unit 2 to set a priority for a communication line corresponding to each detected SIM card (step S1302).

Figure 14:
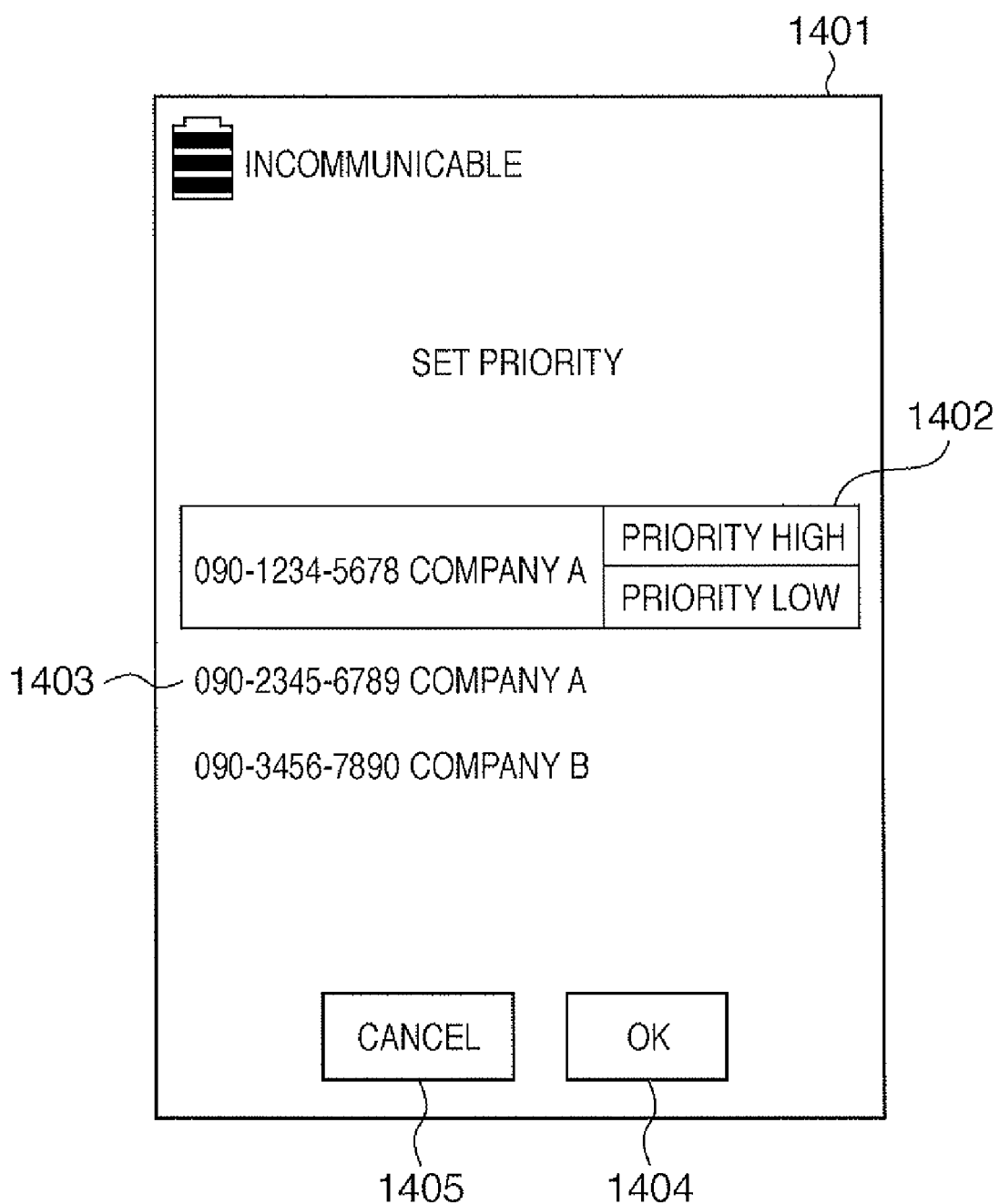
FIG. 14 is a view showing an example of a priority setting display window according to the first embodiment of the present invention.

FIG. 14 shows the priority setting window displayed at this time.

Referring to FIG. 14, a display window 1401 displays information 1403 of a telephone number and sign-up company corresponding to each authenticated SIM card. The user moves a cursor 1402 vertically by operating the key operation unit 9, thereby selecting a telephone number (communication line) to set a priority. When a telephone number is selected, the priority information is displayed on the right side. The user selects and sets one of the priorities by the cursor 1402. When the user moves the cursor 1402 onto a determination button 1404, the priority is stored. Reference numeral 1405 denotes a cancel button.

In this way, the user can set a priority for each communication line by operating the key operation unit 9. In the first embodiment, "high" or "low" is selected and set as the priority.

When the priority is set (step S1303), the information of the priority set for each communication line is stored in a RAM 107. If the priority setting process is canceled, the process is ended without setting a new priority.

In the first embodiment, when a new SIM card is attached to one of the SIM slots 3, 4, and 5, all the priorities-set so far are reset. Then, the priorities of the communication lines corresponding to the SIM cards are uniformly set to higher priorities.

A cell search and standby state process periodically executed after power-on will be described next.

Figure 11:
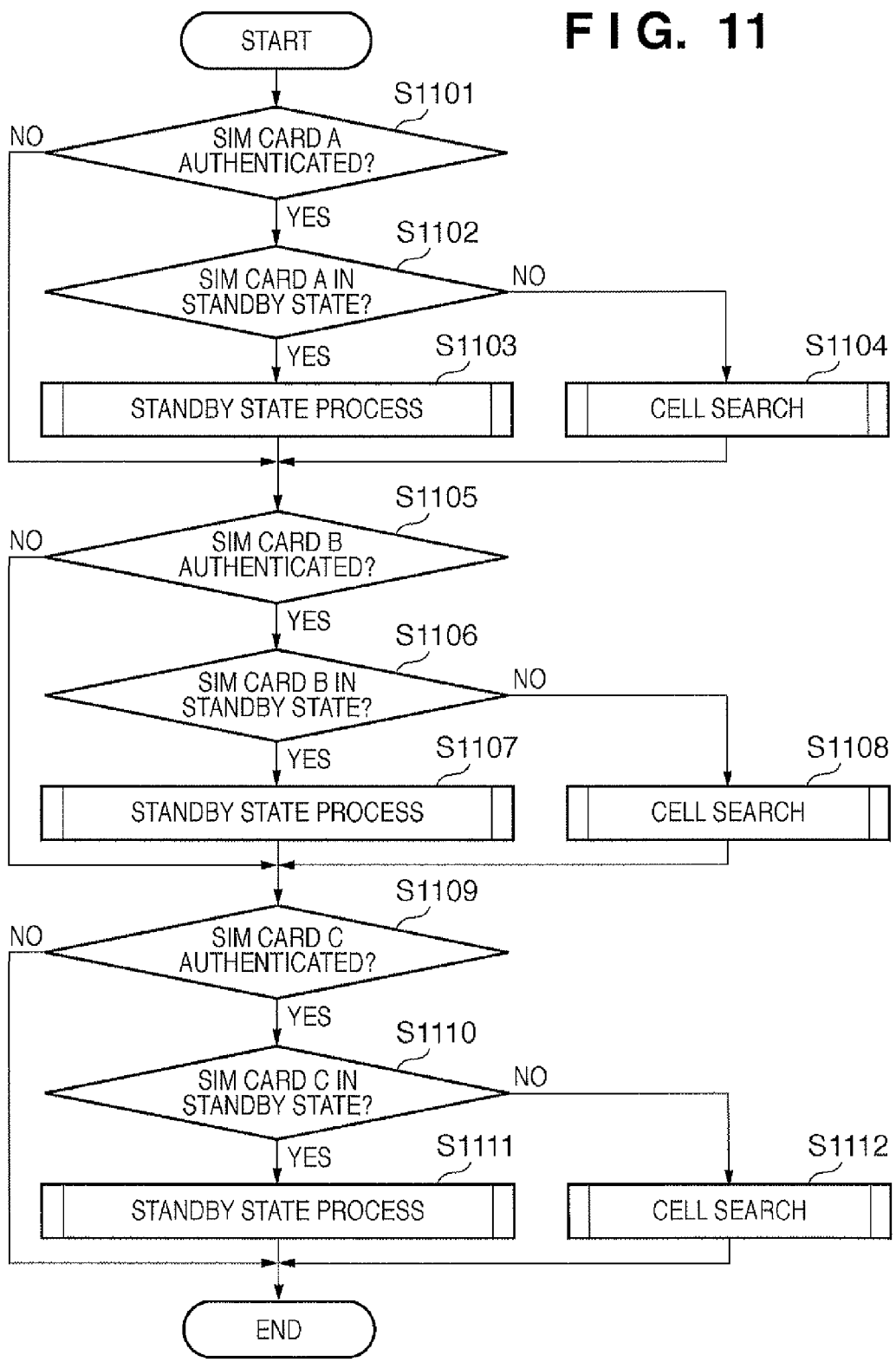
FIG. 11 is a flowchart illustrating a process executed during power-on according to the first embodiment of the present invention.

FIG. 11 is a flowchart illustrating a process executed by the CPU 106 after power-on. The process in FIG. 11 is repeatedly executed at a predetermined interval while the telephone 100 is powered on.

First, the CPU determines whether the SIM card A 6 is already authenticated (step S1101). If the SIM card is not authenticated yet (including a case in which the SIM card A 6 is not attached), the process advances to step S1105. If the SIM card is already authenticated, the CPU determines whether the communication line corresponding to the SIM card A 6 is in the standby state (step S1102). If the communication line is in the standby state, the process advances to step S1103 to execute the process in the standby state.

Figure 12:
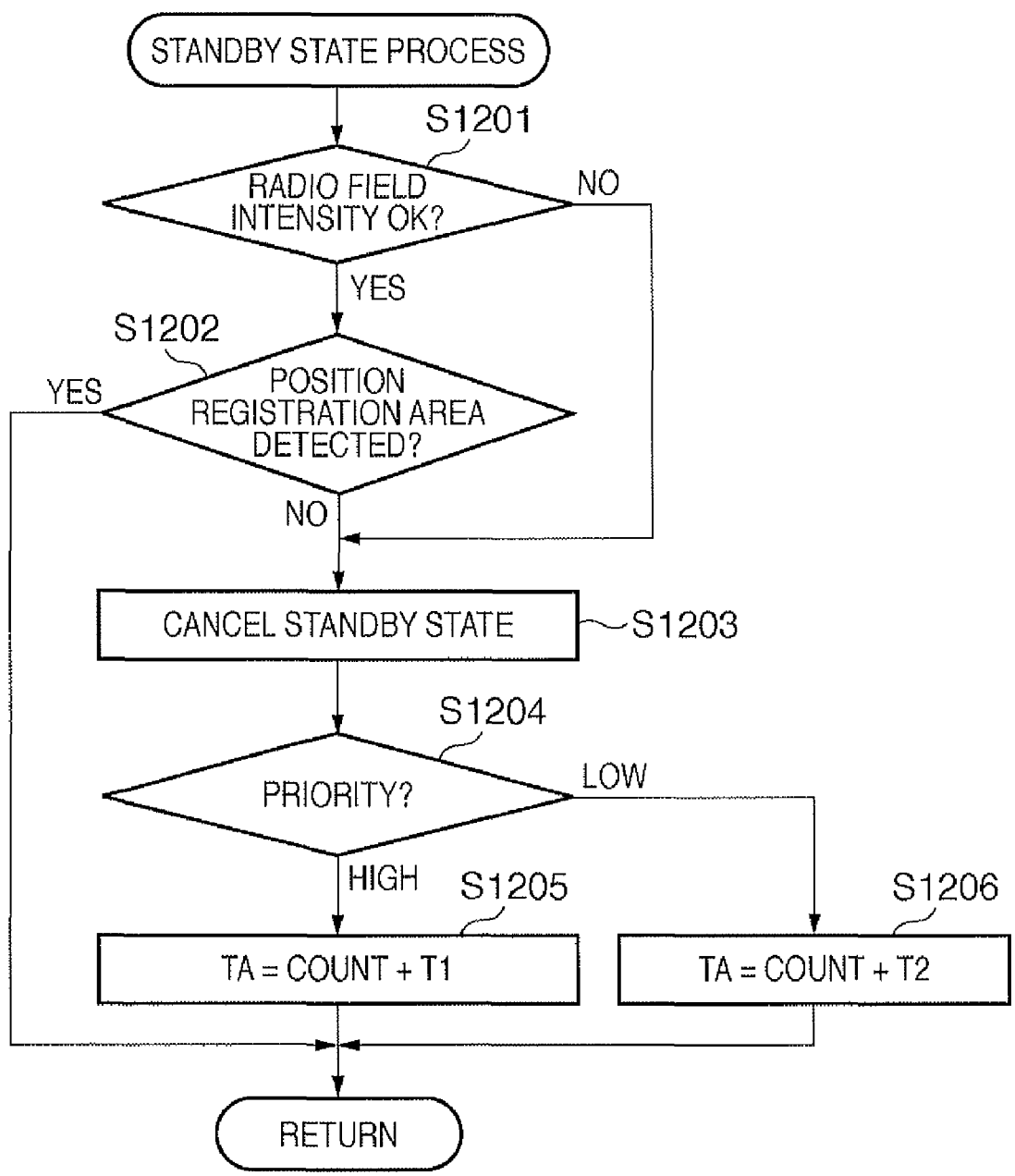
FIG. 12 is a flowchart illustrating a process in a standby state according to the first embodiment of the present invention.

FIG. 12 is a flowchart illustrating the process in the standby state.

First, the CPU compares the radio field intensity for the communication line corresponding to the currently selected SIM card with a threshold value (step S1201). If the radio field intensity is more than the threshold value, a corresponding one of the communication units 101 to 103 receives the signal of a predetermined channel using a known technique, and the current position registration area is detected using the received data (step S1202). If the position registration area is detected, the process is ended. When the position registration area is detected, known processes such as position registration area shift determination and position registration using the position registration area are executed. However, these processes are not directly relevant to the present invention, and a description thereof will be omitted.

On the other hand, if the radio field intensity is equal to or less than the threshold value in step S1201, or if no position registration area is detected in step S1202, the standby state is canceled, and an incommunicable state is set (step S1203). Information representing that the currently selected communication line is in the incommunicable state is stored in the RAM 107.

Next, the CPU determines the priority of the currently selected communication line (step S1204). If the set priority is high, the interval to the next cell search execution is set to T1. T1 is added to the current count value COUNT and set in TA (step S1205).

If the set priority is low in step S1204, the interval to the next cell search execution is set to T2 longer than T1. T2 is added to COUNT and set in TA (step S1206).

Referring back to FIG. 11, if the communication line is not in the standby state in step S1102, the process advances to step S1104 to execute the above-described cell search process.

Figure 10:
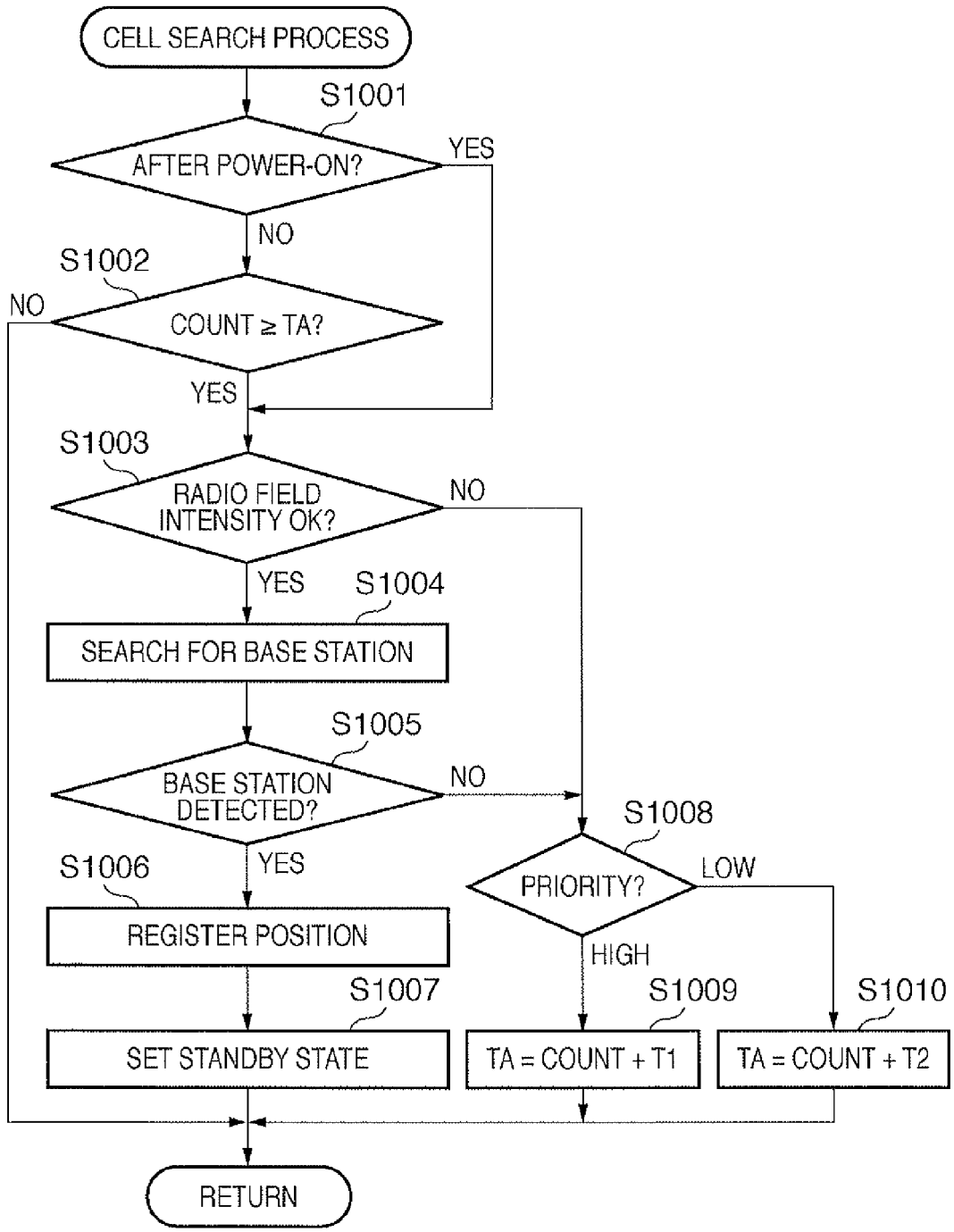
FIG. 10 is a flowchart illustrating the cell search process according to the first embodiment of the present invention.

The cell search process in step S1104 is the same as that shown in FIG. 10. However, since this is not the cell search process immediately after power-on, the process advances from step S1001 to step S1002. In step S1002, the CPU determines the count value COUNT is equal to or larger than the variable of the currently selected SIM card, and for example, TA for the SIM card A 6.

If it is determined that COUNT is equal to or larger than TA, the process advances to step S1003 to execute the above-described process from then on. If COUNT is smaller than TA, the timing of executing the cell search process has not come yet, and the process is ended directly.

Referring back to FIG. 11, the CPU determines whether the SIM card B 7 is already authenticated (step S1105). If the SIM card is not authenticated yet, the process advances to step S1109. If the SIM card is already authenticated, the CPU determines whether the communication line corresponding to the SIM card B 7 is in the standby state (step S1106). If the communication line is in the standby state, the process advances to step S1107 to execute the process in the standby state shown in FIG. 12. In steps S1205 and S1206 in FIG. 12, TB is used in place of TA. On the other hand, if the communication line is not in the standby state but in the incommunicable state, the process advances to step S1108 to execute the cell search process shown in FIG. 10.

Next, the CPU determines whether the SIM card C 8 is already authenticated (step S1109). If the SIM card is not authenticated yet, the process is ended. If the SIM card is already authenticated, the CPU determines whether the communication line corresponding to the SIM card C 8 is in the standby state (step S1110). If the communication line is in the standby state, the process advances to step S1111 to execute the process in the standby state shown in FIG. 12. In steps S1205 and S1206 in FIG. 12, TC is used in place of TA. On the other hand, if the communication line is not in the standby state but in the incommunicable state, the process advances to step S1112 to execute the cell search process shown in FIG. 10.

As described above, in the first embodiment, the execution interval of the cell search process in the incommunicable state is set for each communication line corresponding to a SIM card. Since the cell search process is executed at the set interval, it is possible to appropriately set the cell search process in the incommunicable state and reduce power consumption even when performing communication using a plurality of communication lines.

Especially in the first embodiment, the user sets the priority of each communication line by himself/herself. For this reason, for a communication line for which the user has set a high priority, it is possible to increase the frequency of the cell search process by setting a short execution interval.

A communication line with a high priority can quickly shift to the standby state when it is returned to a zone where the radio field intensity from a base station is high.

Additionally, it is possible to suppress power consumption by setting a long cell search process execution interval for a communication line with a low priority.

In the first embodiment, priorities of two steps are set for the plurality of communication lines. However, the present invention is not limited to this, and priorities of three or more steps may be set. In addition, the user may select the cell search execution interval from a plurality of predetermined intervals.

<Second Embodiment>

The second embodiment will be described next.

The second embodiment is different from the first embodiment in the priority setting process.

In the first embodiment, the priority is set for each communication line corresponding to an attached SIM card, and the cell search process execution interval is set.

In the second embodiment, the priority is set for each communication carrier (sign-up company) corresponding to an attached SIM card.

Figure 15:
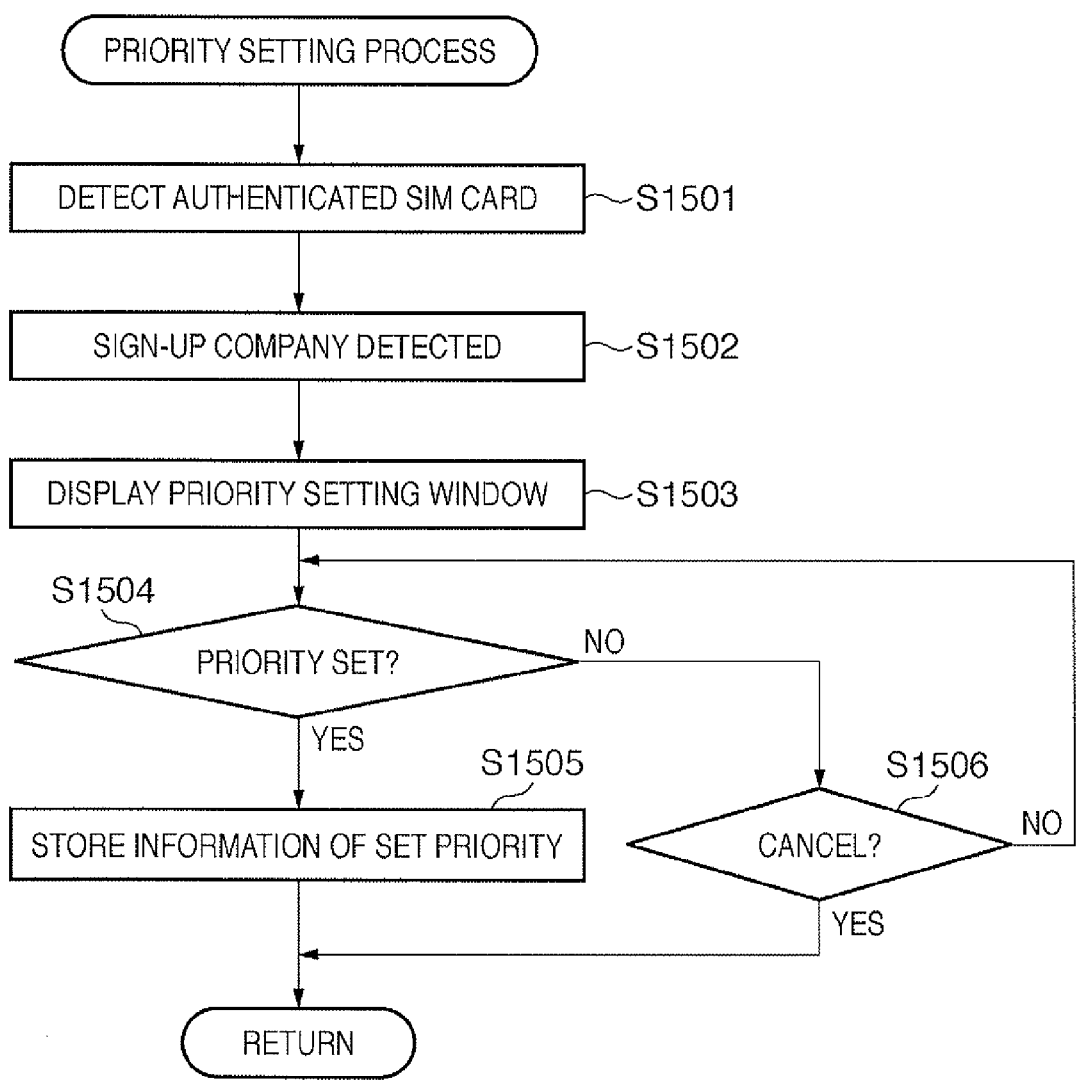
FIG. 15 is a flowchart illustrating a priority setting process according to a second embodiment of the present invention.

FIG. 15 is a flowchart illustrating the priority setting process according to the second embodiment.

When the user displays a menu window on a display unit 2 by operating a key operation unit 9, and selects a priority setting item on the menu window, the sequence in FIG. 15 starts. Note that a CPU 106 executes the process in FIG. 15.

When the user inputs the priority setting instruction, the CPU detects an authenticated one of SIM cards attached to SIM slots 3, 4, and 5 (step S1501). The CPU detects a sign-up company corresponding to the authenticated SIM card (step S1502). The CPU displays a setting window on the display unit 2 to set a priority for a sign-up company corresponding to each detected SIM card (step S1503).

Figure 16:
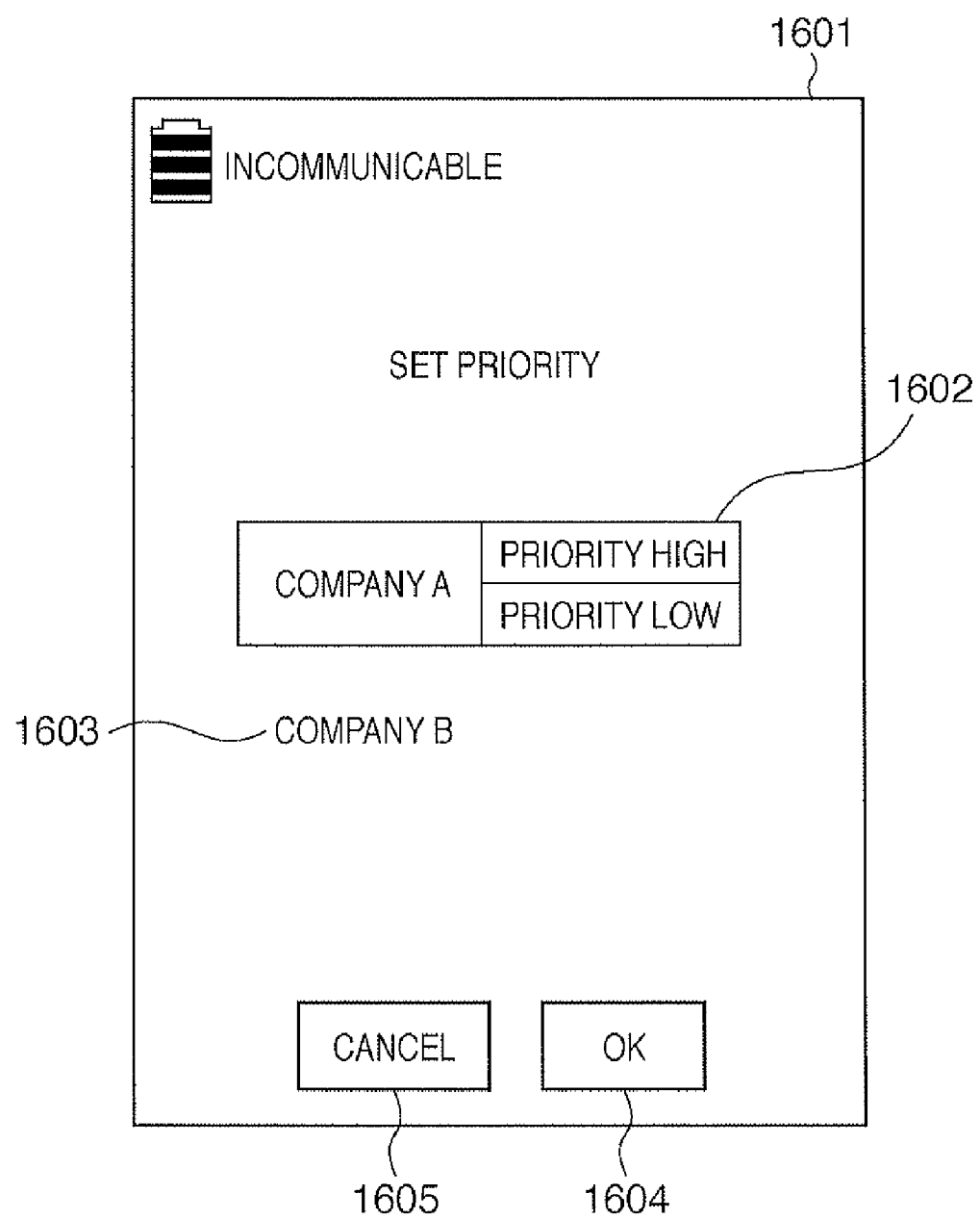
FIG. 16 is a view showing an example of a priority setting display window according to the second embodiment of the present invention.

FIG. 16 shows the priority setting window displayed at this time.

Referring to FIG. 16, a display window 1601 displays information 1603 of a sign-up company corresponding to each authenticated SIM card. The user moves a cursor 1602 vertically by operating the key operation unit 9, thereby selecting a sign-up company (communication line) to set a priority. When a sign-up company is selected, the priority information is displayed on the right side. The user selects and sets one of the priorities by the cursor 1602. When the user moves the cursor 1602 onto a determination button 1604, the priority is stored. Reference numeral 1605 denotes a cancel button.

In this way, the user can set a priority for each sign-up company by operating the key operation unit 9. In this embodiment, "high" or "low" is selected and set as the priority.

When the priority is set (step S1504), the CPU detects a communication line corresponding to each sign-up company and stores, in a RAM 107, the information of the priority set for each communication line (step S1505). If the priority setting process is canceled, the process is ended without setting a new priority (step S1506).

In the second embodiment, when a new SIM card is attached to one of the SIM slots 3, 4, and 5, all the priorities set so far are reset. Then, the priorities of the communication lines corresponding to the SIM cards are uniformly set to higher priorities.

The remaining processes are the same as those described in the first embodiment, and a description thereof will not be repeated.

As described above, in the second embodiment, the user sets the priority of each sign-up company by himself/herself. For this reason, for the communication line of a sign-up company for which the user has set a high priority, it is possible to increase the frequency of the cell search process by setting a short execution interval.

The communication line of a sign-up company with a high priority can quickly shift to the standby state when it is returned to a zone where the radio field intensity from a base station is high.

Additionally, it is possible to suppress power consumption by setting a long cell search process execution interval for a communication line with a low priority.

<Third Embodiment>

The third embodiment will be described next.

The third embodiment is different from the first embodiment in the priority setting process.

The third embodiment allows the user to set an application purpose for an attached SIM card. Then, the user sets the priority for each application purpose.

The user displays a menu window by operating a key operation unit 9, and sets an application purpose for each communication line corresponding to a SIM card using the menu window. In the third embodiment, two application purposes for business use and personal use are prepared in advance. The user can select and set one of the two application purposes. Any other application purpose may be prepared in advance.

Additionally, the user may set an application purpose according to his/her needs.

When the user sets the application purpose, the information of the set application purpose is stored in a RAM 107 in correspondence with each communication line.

Figure 17:
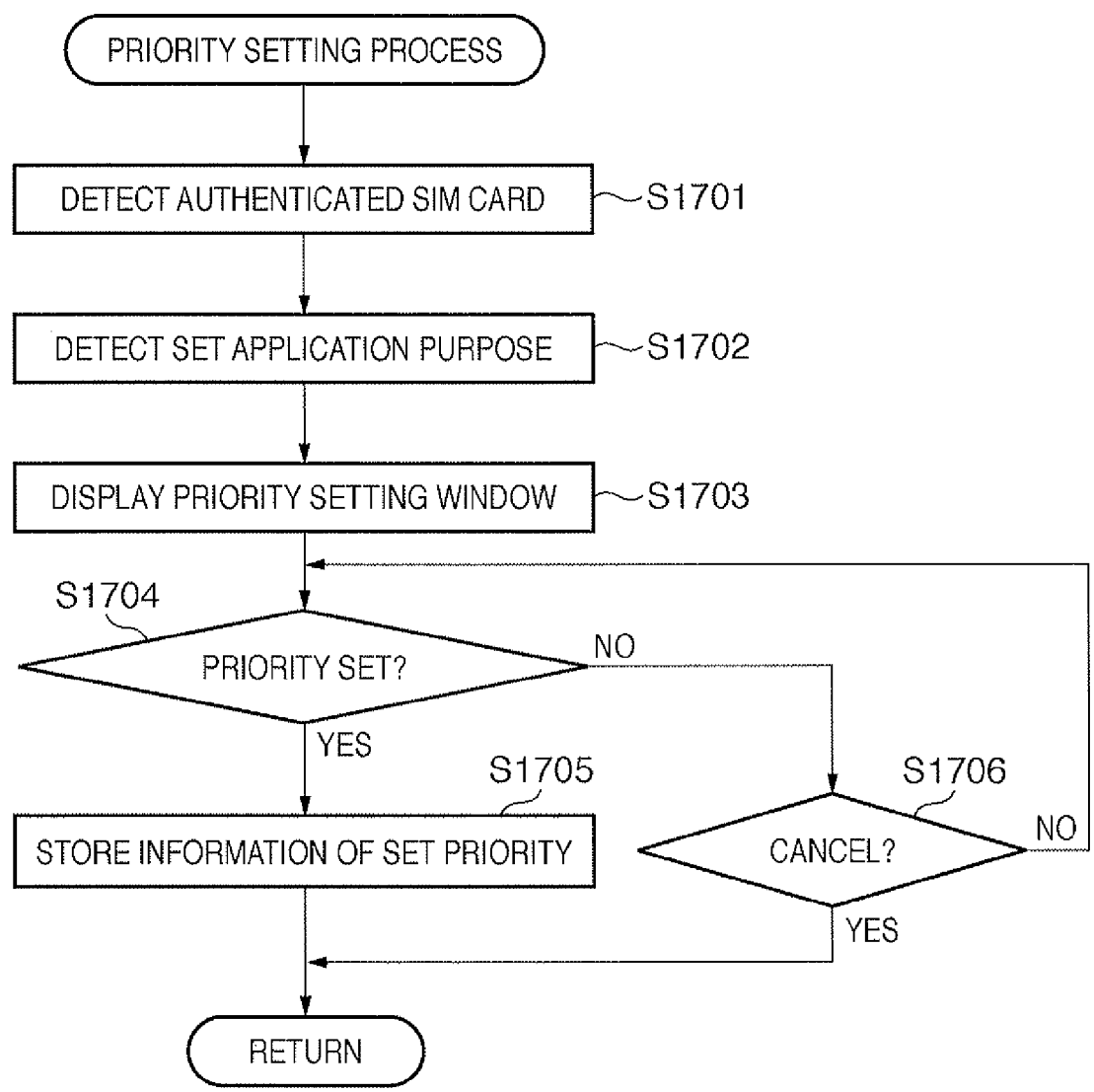
FIG. 17 is a flowchart illustrating a priority setting process according to a third embodiment of the present invention.

After thus setting the application purpose of each communication line, the priority in cell search is set for each application purpose. FIG. 17 is a flowchart illustrating the priority setting process according to the third embodiment.

When the user displays a menu window on a display unit 2 by operating the key operation unit 9, and selects a priority setting item on the menu window, the sequence in FIG. 17 starts. Note that a CPU 106 executes the process in FIG. 17.

When the user inputs the priority setting instruction, the CPU detects an authenticated one of SIM cards attached to SIM slots 3, 4, and 5 (step S1701). The CPU detects the information of application purpose set for each authenticated SIM card (step S1702). The CPU displays a setting window on the display unit 2 to set a priority for the application purpose corresponding to each detected SIM card (step S1703).

Figure 18:
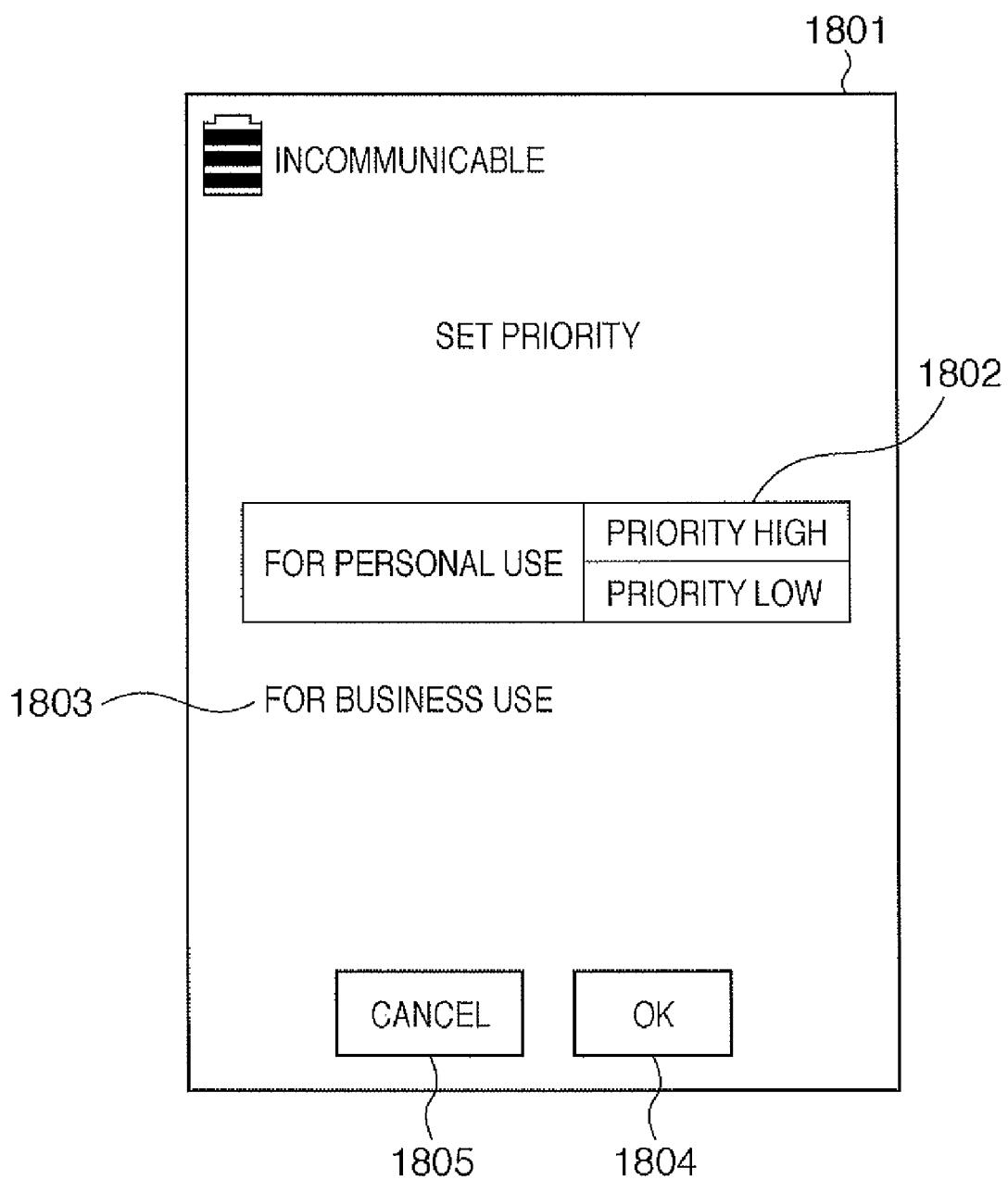
FIG. 18 is a view showing an example of a priority setting display window according to the third embodiment of the present invention.

FIG. 18 shows the priority setting window displayed at this time.

Referring to FIG. 18, a display window 1801 displays information 1803 of an application purpose corresponding to each authenticated SIM card. In the third embodiment, two application purposes for personal use and business use are prepared in advance, and the pieces of information of these application purposes are displayed.

The user moves a cursor 1802 vertically by operating the key operation unit 9, thereby selecting an application purpose to set a priority. When an application purpose is selected, the priority information is displayed on the right side. The user selects and sets one of the priorities by the cursor 1802. When the user moves the cursor 1802 onto a determination button 1804, the priority is stored. Reference numeral 1805 denotes a cancel button.

The user can set a priority for each application purpose by operating the key operation unit 9. In the third embodiment, "high" or "low" is selected and set as the priority.

When the priority is set (step S1704), the CPU detects a communication line corresponding to each application purpose and stores, in the RAM 107, the information of the priority set for each communication line (step S1705). If the priority setting process is canceled, the process is ended without setting a new priority (step S1706).

In the third embodiment, the user sets the application purpose of each communication line and then sets the priority of each application purpose. For this reason, for the communication line of an application purpose for which the user has set a high priority, it is possible to increase the frequency of the cell search process by setting a short execution interval.

The communication line of an application purpose with a high priority can quickly shift to the standby state when it is returned to a zone where the radio field intensity from a base station is high.

Additionally, it is possible to suppress power consumption by setting a long cell search process execution interval for a communication line with a low priority.

<Fourth Embodiment>

The fourth embodiment will be described next.

In the first to third embodiments, the user sets the priority in cell search in correspondence with each communication line, each sign-up company, or each application purpose.

In the fourth embodiment, however, the priority in cell search is automatically determined in accordance with the use state of a telephone 100. More specifically, the priority is determined in accordance with the number of carriers of telephone numbers registered in a telephone book.

In the fourth embodiment, not only the telephone numbers but also the carrier information of partners can be registered in the telephone book.

More specifically, the user displays a telephone book registration window by operating a key operation unit 9 and registers partners telephone numbers and other information using the telephone book registration window. In the fourth embodiment, the information of the carriers of partners can also be registered. The pieces of information of the registered names, telephone numbers, and carriers of partners are stored in a RAM 107 as telephone book information.

In the fourth embodiment, an outgoing call process using the telephone book can be performed, as is known. More specifically, the user displays the telephone book, selects a partner's telephone number from the registered telephone numbers, and instructs an outgoing call, thereby calling the selected partner.

When the contents of the telephone book are updated, a priority setting process is executed.

Figure 19:
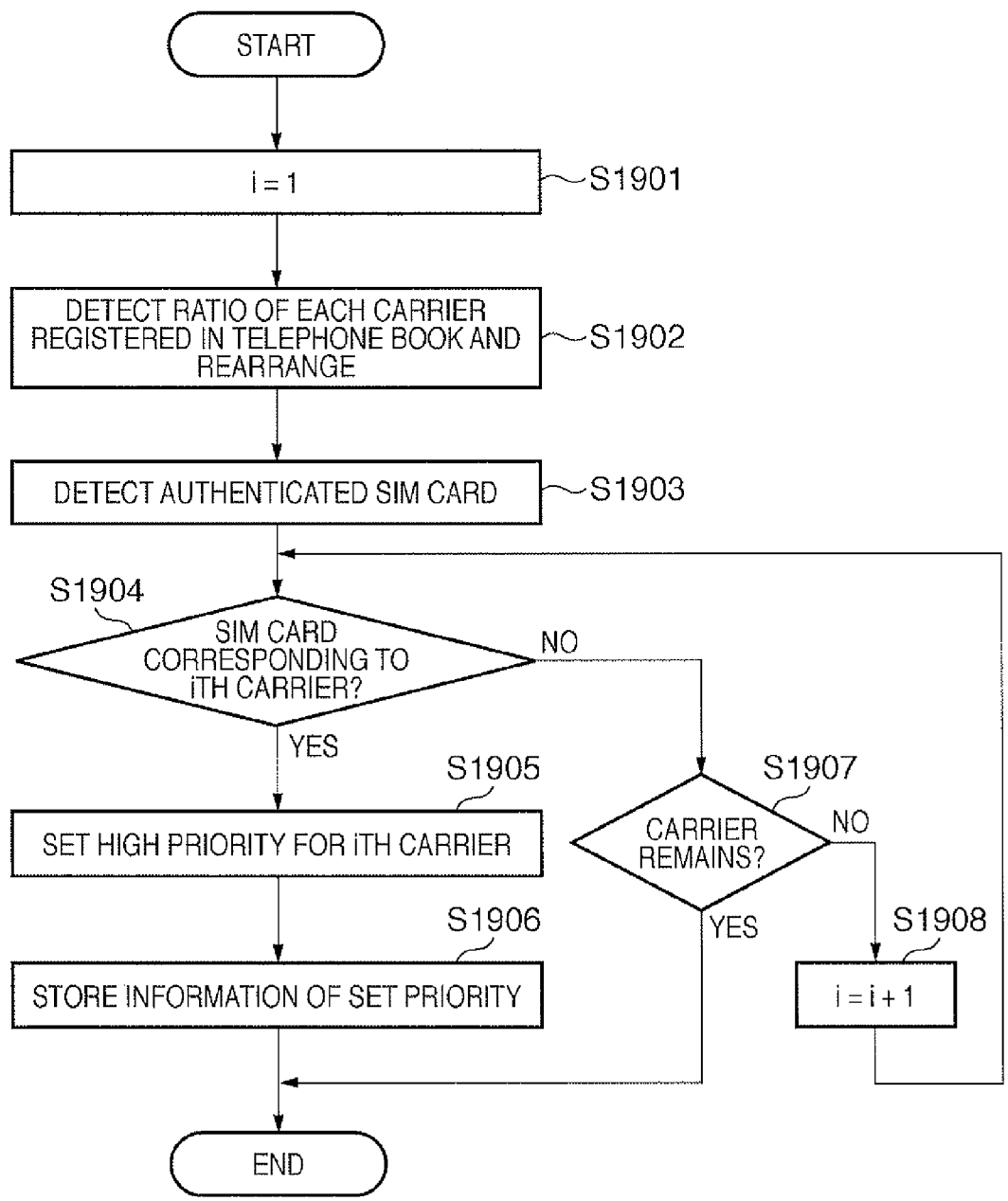
FIG. 19 is a flowchart illustrating a priority setting process according to a fourth embodiment of the present invention.

FIG. 19 is a flowchart illustrating the priority setting process. Note that a CPU 106 implements the process in FIG. 19. The process in FIG. 19 is executed when the telephone 100 is powered on, when the contents of the telephone book are updated, and when a SIM card is attached to a slot or removed.

The CPU sets a variable i to 1 (step S1901). The CPU confirms the telephone book information stored in the RAM 107 and calculates, for each carrier, the number of carriers corresponding to the telephone numbers registered in the telephone book. The CPU rearranges the carriers in descending order of ratio (step S1902).

The CPU detects the carrier of an authenticated SIM card (step S1903).

The CPU determines in accordance with the order of carriers rearranged in step S1902 whether a SIM card corresponding to the ith carrier is authenticated (step S1904). If a SIM card corresponding to the ith carrier is authenticated, the CPU sets a high priority for the ith carrier (step S1905). The CPU sets a high priority for, of all authenticated SIM cards, all SIM cards corresponding to the ith carrier and stores the priority information in the RAM 107 (step S1906).

If no SIM card corresponding to the ith carrier is authenticated in step S1904, the CPU determines whether a carrier calculated in step S1902 remains (step S1907). If no carrier remains, the process is ended.

If a carrier remains, the CPU increments the variable i by 1, and the process returns to step S1904 (step S1908).

After the priority is set in this way, the cell search process or the process in the standby state is executed, as shown in FIGS. 10 to 12.

There is high probability that the telephone 100 receives calls from, of the partners registered in the telephone book, those who use the carrier of the highest ratio.

In the fourth embodiment, a high priority is set for a SIM card corresponding to the carrier of the highest ratio in the carriers corresponding to the telephone numbers registered in the telephone book. For this reason, for the communication line of a carrier for which the user has set a high priority, it is possible to increase the frequency of the cell search process by setting a short execution interval.

Additionally, it is possible to suppress power consumption by reducing the frequency of the cell search process for lines corresponding to the remaining carriers.

<Fifth Embodiment>

The fifth embodiment will be described next.

In the fourth embodiment, the user sets the priority based on the ratio of the carrier of partners registered in the telephone book.

In the fifth embodiment, however, the priority in cell search is automatically determined in accordance with the communication log of a telephone 100.

In the fifth embodiment as well, not only the telephone numbers of partners but also the information of sign-up companies can be registered in the telephone book. When the telephone 100 communicates with a partner registered in the telephone book by an outgoing call or incoming call, the information of the partner's number, name, and carrier, and the communication time is stored in a RAM 107 as log information. Log information of an outgoing call from the telephone 100 is stored as outgoing call log (redial) information, whereas log information of an incoming call is stored as an incoming call log information. In the fifth embodiment, a log of several ten calls, e.g., 30 calls in the past is stored.

When communication by a new incoming call has finished, a priority setting process is executed.

Figure 20:
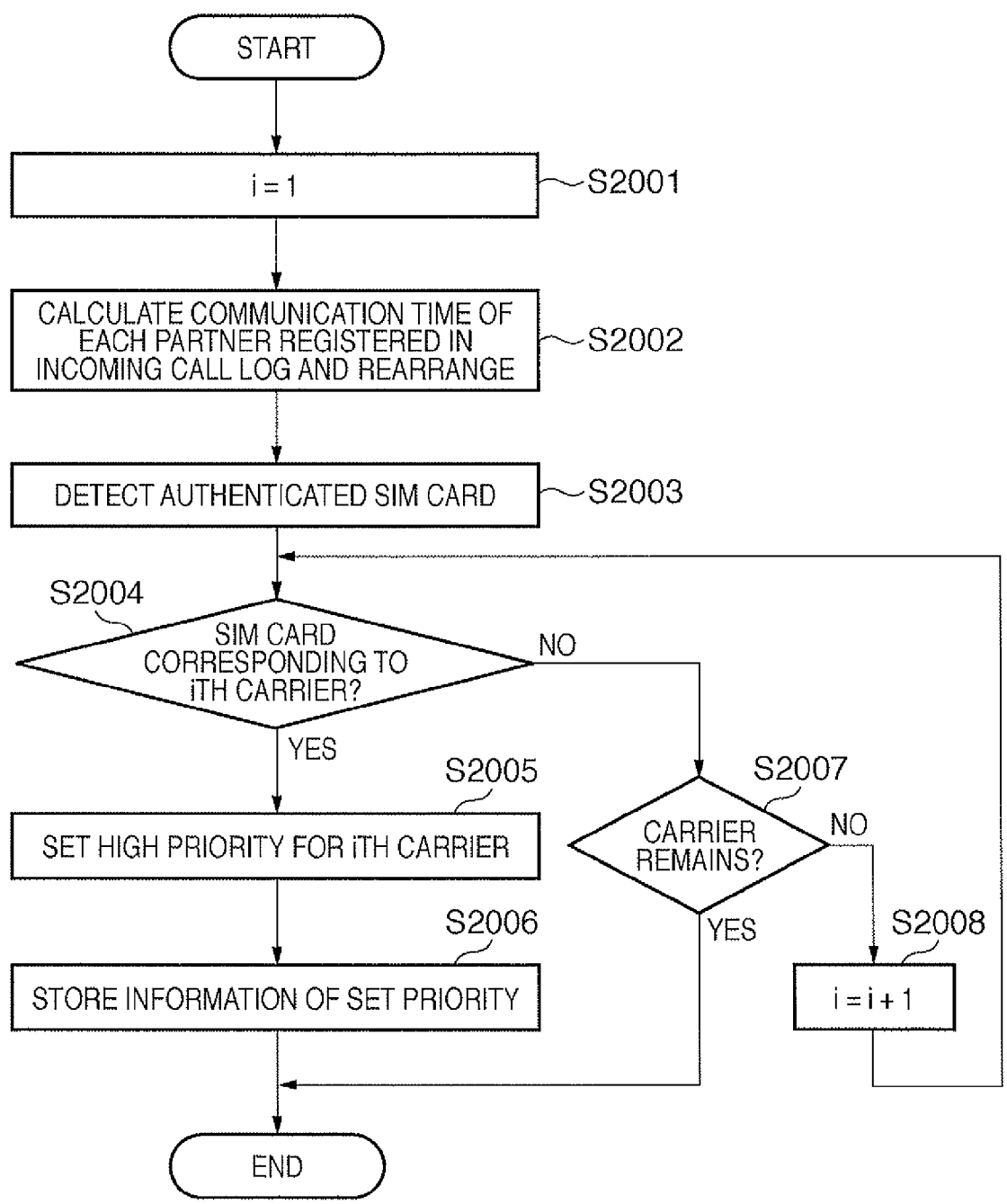
FIG. 20 is a flowchart illustrating a priority setting process according to a fifth embodiment of the present invention.

FIG. 20 is a flowchart illustrating the priority setting process. Note that a CPU 106 implements the process in FIG. 20. The process in FIG. 20 is executed when the telephone 100 is powered on, when communication by a new incoming call has finished, and when a SIM card is attached to a slot or removed.

The CPU sets a variable i to 1 (step S2001). The CPU confirms the outgoing call log information stored in the RAM 107 and calculates the communication time of each registered partner for each carrier of the partner. The CPU rearranges the partners in descending order of ratio (step S2002).

The CPU detects the carrier of an authenticated SIM card (step S2003).

The CPU determines in accordance with the order of partners rearranged in step S2002 whether a SIM card corresponding to the ith carrier is authenticated (step S2004). If a SIM card corresponding to the ith carrier is authenticated, the CPU sets a high priority for the ith carrier (step S2005). The CPU sets a high priority for, of all authenticated SIM cards, all SIM cards corresponding to the ith carrier and stores the priority information in the RAM 107 (step S2006).

If no SIM card corresponding to the ith carrier is authenticated in step S2004, the CPU determines whether a carrier calculated in step S2002 remains (step S2007). If no carrier remains, the process is ended.

If a carrier remains, the CPU increments the variable i by 1, and the process returns to step S2004 (step S2008).

After the priority is set in this way, the cell search process or the process in the standby state is executed, as shown in FIGS. 10 to 12.

There is high probability that the telephone 100 makes a call to one of the partners registered in the outgoing call log who has the longest communication time.

In the fifth embodiment, a high priority is set for a SIM card of a carrier corresponding to a partner who has a long communication time in the partners stored in the outgoing call log. For this reason, for the communication line of a carrier for which the user has set a high priority, it is possible to increase the frequency of the cell search process by setting a short execution interval.

In the fifth embodiment, the communication time of each partner registered in the outgoing call log is calculated, and a high priority is set for the carrier of a partner with the longest communication time. Not the communication time but information of the number of outgoing calls may also be used.

In the above-described second to fifth embodiments, priorities of two steps are set for the plurality of communication lines. However, the present invention is not limited to this, and priorities of three or more steps may be set. In this case, the cell search process execution interval is set shorter for a higher priority.

In the above-described first to fifth embodiments, the remaining battery level may be detected. When the battery level is less than a threshold value, the cell search interval may be changed in accordance with the priority of each communication line.

<Sixth Embodiment>

The sixth embodiment of the present invention will be described next.

The sixth embodiment is different from the above-described first to fifth embodiments in the cell search process which is performed after the end of the SIM card detection and authentication process executed in the way described with reference to FIGS. 5A and 5B upon power-on. Hence, the cell search process executed upon powering on a telephone 100 according to the sixth embodiment will be explained.

A telephone which performs communication using the W-CDMA method or CDMA2000 method searches for a communicable base station from radio base stations that cover a number of cells included in each position registration area. The telephone performs communication via the base station detected by the search to detect the cell to which the telephone 100 belongs, and transmits identification information read out from each SIM card to the control apparatus of the wireless network, thereby registering the position.

The telephone 100 of the sixth embodiment executes such a cell search operation.

Figure 21:
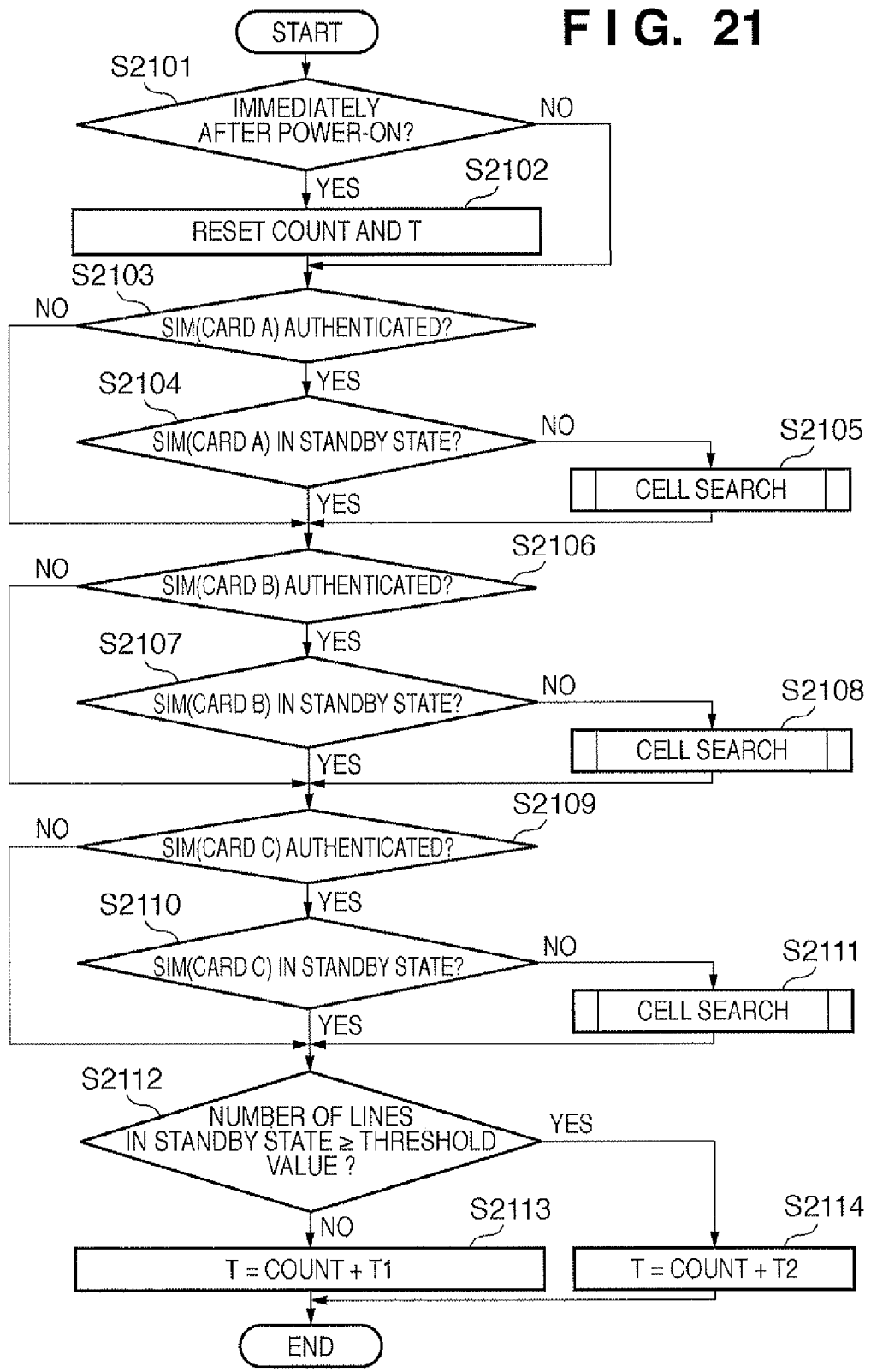
FIG. 21 is a flowchart illustrating a cell search process interval setting operation according to a sixth embodiment of the present invention.

FIG. 21 is a flowchart illustrating a process of cell search executed upon power-on. The process in FIG. 21 is executed even at a timing when the count value of the internal counter of a CPU 106 matches a variable T, as will be described later. Note that the CPU 106 executes the process in FIG. 21.

First, the CPU determines whether it is a process immediately after power-on (step S2101). If it is not a process immediately after power-on, i.e., if it is a process when the value of the internal counter has reached T, as will be described later, the process advances to step S2103.

If it is a process immediately after power-on, the CPU resets a count value COUNT of the internal counter and the variable T (step S2102). The variable T determines the cell search process execution interval.

Next, the CPU determines whether a SIM card A 6 is already authenticated (step S2103). If the SIM card is not authenticated yet (including a case in which the SIM card A 6 is not attached), the process advances to step S2106. If the SIM card is already authenticated, the CPU determines whether a communication line corresponding to the SIM card A 6 is in a standby state for an incoming call (step S2104). If the communication line is in the standby state, the process advances to step S2106. Since the communication line is not in the standby state immediately after power-on, the process advances to the cell search process (step S2105).

Figure 22:
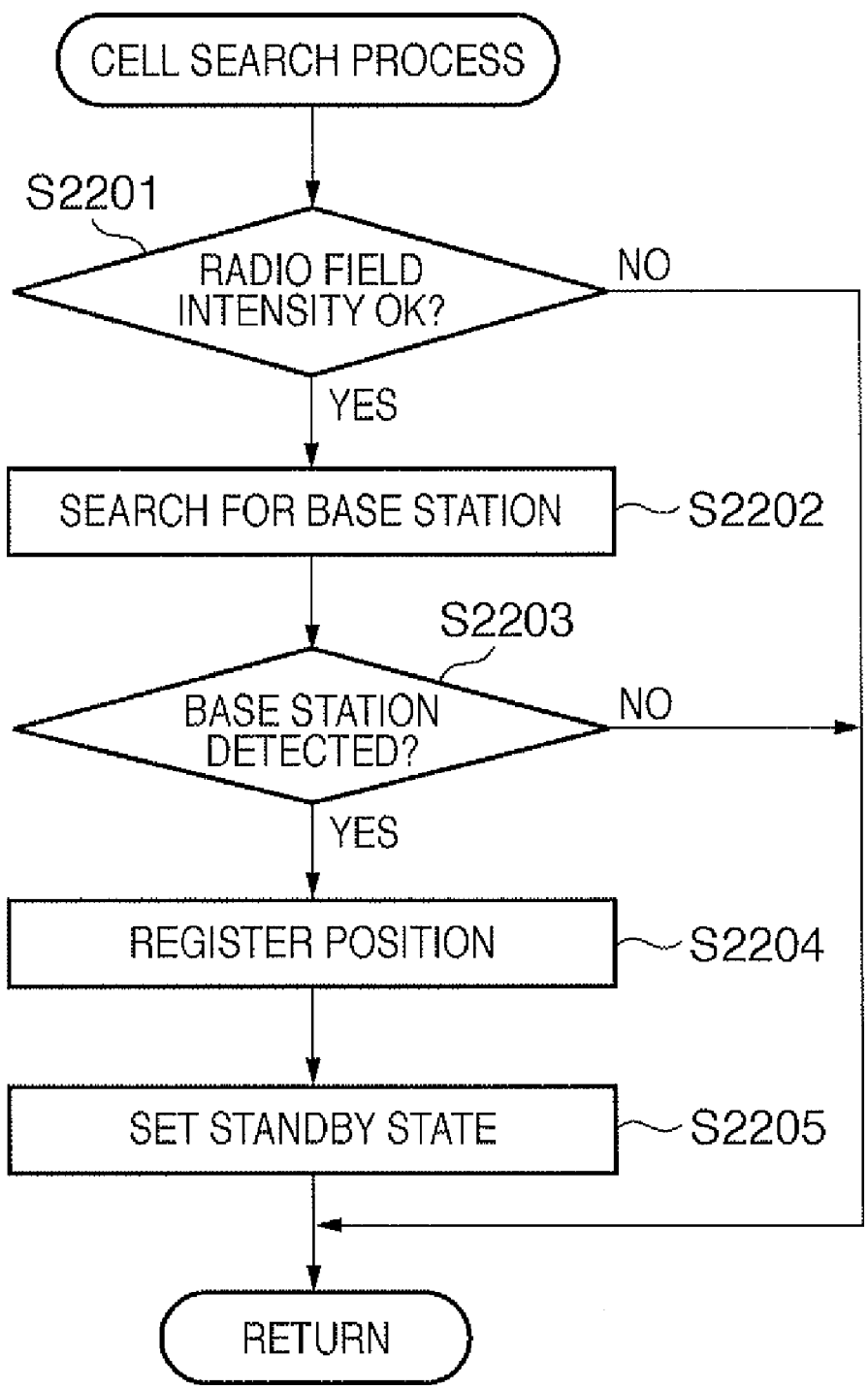
FIG. 22 is a flowchart illustrating a cell search process according to the sixth embodiment of the present invention.

The cell search process will be described with reference to the flowchart in FIG. 22. The process in FIG. 22 is executed commonly for the respective SIM cards.

First, the CPU determines the radio field intensity from each base station in the neighborhood (step S2201). If the radio field intensity is more than a threshold value, a communication unit corresponding to the selected SIM card searches for a communicable one of the base stations in the neighborhood (step S2202).

The CPU determines whether a base station is detected by the search (step S2203). If a base station is detected, communication with the base station is performed, and a position registration process is executed using a known technique (step S2204). The standby state is set for the communication line corresponding to the selected SIM card, and information representing it is stored in a RAM 107 (step S2205).

On the other hand, if the radio field intensity is equal to or less than the threshold value in step S2201, or no base station is detected in step S2203, the CPU determines that the telephone is in an incommunicable state and finishes the process.

Referring back to FIG. 21, after the cell search process of the SIM card A 6 is completed, the CPU determines whether a SIM card B 7 is already authenticated (step S2105). If the SIM card is not authenticated yet, the process advances to step S2109. If the SIM card is already authenticated, the CPU determines whether a communication line corresponding to the SIM card B 7 is in the standby state (step S2107). If the communication line is not in the standby state, the process advances to the cell search process for the SIM card B 7 in FIG. 22 (step S2108). In the standby state, the process advances to step S2109.

After the cell search process of the SIM card B 7 is completed, the CPU determines whether a SIM card C 8 is already authenticated (step S2109). If the SIM card is not authenticated yet, the process advances to step S2112. If the SIM card is already authenticated, the CPU determines whether a communication line corresponding to the SIM card C 8 is in the standby state (step S2110). If the communication line is not in the standby state, the process advances to the cell search process for the SIM card C 8 in FIG. 22 (step S2111). In the standby state, the process advances to step S2112.

The CPU determines whether the number of communication lines in the standby state of the SIM cards A 6 to C 8 is equal to or larger than a threshold value (step S2112).

If the number of lines in the standby state is not equal to or larger than the threshold value, the interval to the next cell search execution is set to T1. T1 is added to the count value of the counter (step S2113). If the number of lines in the standby state is equal to or larger than the threshold value, the interval to the next cell search execution is set to T2 longer than T1. T2 is added to the count value of the counter (step S2114).

The CPU 106 executes the process in FIG. 21 when the value COUNT of the internal counter is T or more.

The process in the standby state for an incoming call will be described next.

Figure 23:
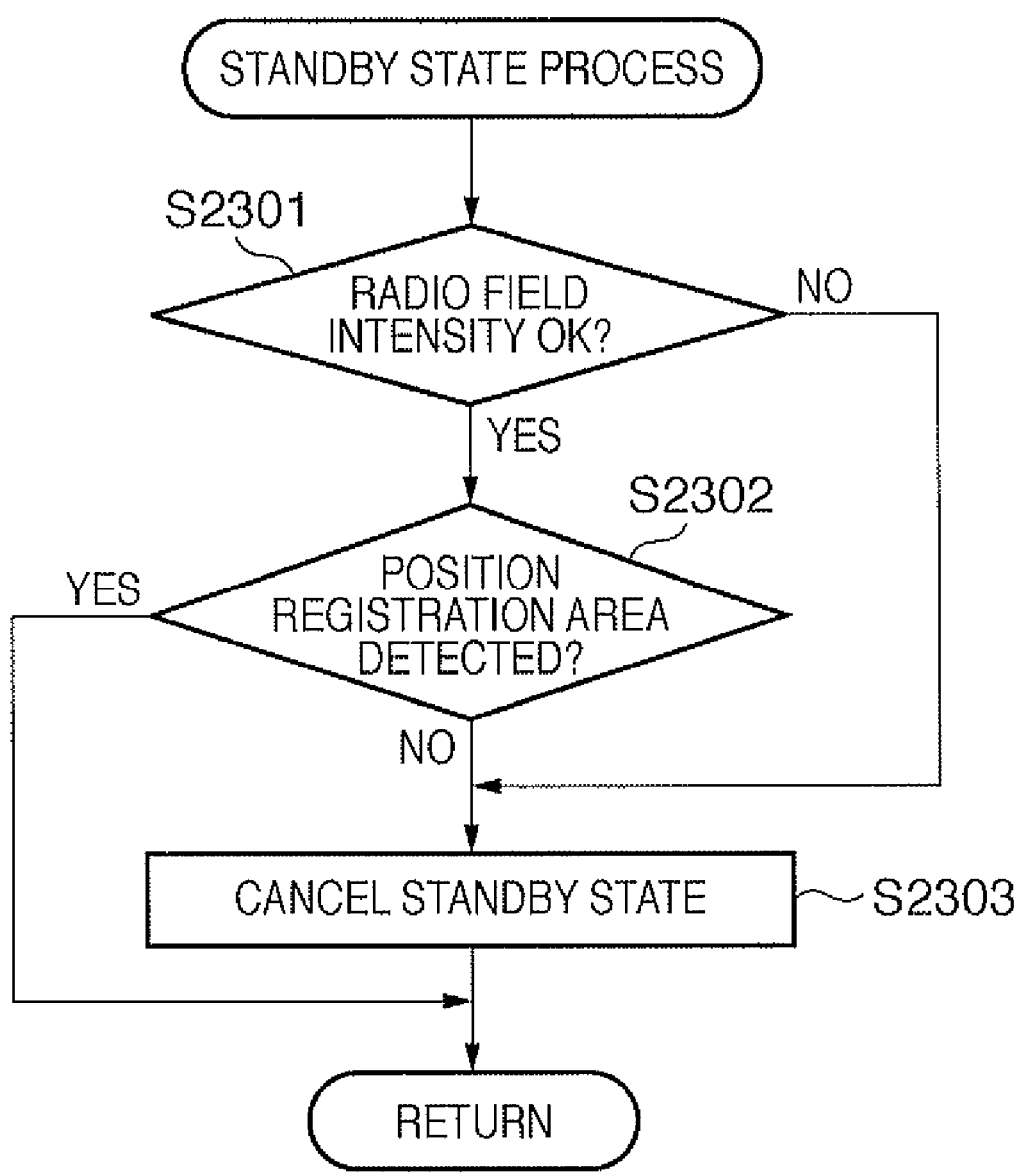
FIG. 23 is a flowchart illustrating a process in a standby state according to the sixth embodiment of the present invention.

FIG. 23 is a flowchart illustrating the process of the CPU 106 in the standby state. The process in FIG. 23 is repeatedly executed at a predetermined timing for, of the SIM cards A 6 to C 8 attached to the SIM slots, SIM cards in the standby state.

First, the CPU compares the radio field intensity for the communication line corresponding to the SIM card with a threshold value (step S2301). If the radio field intensity is more than the threshold value, the communication unit receives the signal of a predetermined channel using a known technique, and the current position registration area is detected using the received data (step S2302). If the position registration area is detected, the process is ended. When the position registration area is detected, known processes such as position registration area shift determination and position registration using the position registration area are executed. However, these processes are not directly relevant to the present invention, and a description thereof will be omitted.

On the other hand, if the radio field intensity is equal to or less than the threshold value in step S2301, or if no position registration area is detected in step S2302, the standby state is canceled, and an incommunicable state is set (step S2303).

Information representing that the currently selected communication line is in the incommunicable state is stored in the RAM 107.

In this embodiment, the user can set the threshold value to be used in step S2112 of FIG. 21 by operating a key operation unit 9. More specifically, the user displays a menu window on a display unit 2 by operating the key operation unit 9, and sets the threshold value of the number of lines in the standby state using the menu window.

As described above, in the sixth embodiment, when, of the communication lines corresponding to the SIM cards attached to the telephone 100, the number of communication lines in the standby state is equal to or larger than the threshold value, the cell search process interval is increased.

It is therefore possible to suppress power consumption by setting a long cell search process interval after communication lines in number equal to or more than the threshold value set by the user are set in the standby state.

In the sixth embodiment, the user sets the threshold value of the number of lines in the standby state. However, the present invention is not limited to this. A predetermined number of lines may be set as the threshold value. The cell search interval may be set long when the predetermined number of lines are set in the standby state.

In the sixth embodiment, the telephone has three SIM slots so that three SIM cards can be attached simultaneously. However, the telephone may be designed to attach two SIM cards or four or more SIM cards.

Assume that two SIM cards are attached, and communication is performed using two lines. In this case, when one line is set in the standby state, a long cell search process interval is set for the other line.

In the above-described embodiments, the CDMA2000 method and the W-CDMA method are used as the communication methods. A communication method by any other cellular method is also usable.

In the above-described embodiments, a communication line is set by reading out subscriber identification information from a SIM card. The present invention is applicable even when identification information stored not in a SIM card but in any other storage medium is used.

In the above-described embodiments, the present invention is applied to a mobile telephone. However, the present invention is also applicable to any other device which performs communication using a plurality of communication lines.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-219923 filed on Aug. 27, 2007 and 2007-219924 filed on Aug. 27, 2007, which are hereby incorporated by reference herein in their entirety.

The invention claimed is:

1. A communication apparatus comprising:
a read-out unit configured to read out identification information from each of a plurality of storage media each storing identification information about a communication line;
a communication unit configured to determine a plurality of communication lines corresponding to the plurality of storage media based on the identification information read out from the plurality of storage media by said read-out unit, and performing to perform communication with a base station using one of the plurality of determined communication lines; and
a control unit configured to control said communication unit to execute a search process of searching for a base station communicable with said communication unit at an interval determined for each of the plurality of determined communication lines,
wherein said control unit controls said communication unit to execute the search process for a communication line, based on the identification information of the plurality of storage media, that is not set in a standby state.

2. The apparatus according to claim 1, further comprising a setting unit configured to set a priority for each of the plurality of determined communication lines
wherein said control unit determines the interval of the search process to be executed by said communication unit in accordance with the priority of each of the plurality of determined communication lines set by said setting unit.

3. The apparatus according to claim 2, further comprising an operation unit which sets the priority of each of the plurality of determined communication lines.

4. The apparatus according to claim 2, wherein said setting unit sets the priority of each of the plurality of determined communication lines based on a priority of each of a plurality of communication carriers of the plurality of determined communication lines.

5. The apparatus according to claim 4, further comprising an operation unit which sets the priority of each of the plurality of communication carriers.

6. The apparatus according to claim 2, wherein said setting unit sets the priority of each of the plurality of determined communication lines based on a priority of each of a plurality of application purposes of the plurality of determined communication lines.

7. The apparatus according to claim 6, further comprising an operation unit which sets the priority of each of the plurality of application purposes.

8. The apparatus according to claim 2, further comprising a storage unit configured to store information of a telephone book which associates a number of a line of each partner with a communication carrier,
wherein said control unit sets the priority of each of the plurality of determined communication lines based on the communication carrier in the information of the telephone book.

9. The apparatus according to claim 2, further comprising a storage unit configured to store log information of communication by said communication unit,
wherein said control unit sets the priority of each of the plurality of determined communication lines based on the log information of the communication.

10. The apparatus according to claim 9, wherein the log information of the communication includes a number of a line of each partner and a communication carrier of the line.

11. The apparatus according to claim 2, wherein said control unit shortens the interval of the search process to be executed by said communication unit as the priority becomes high.

12. The apparatus according to claim 1, further comprising a plurality of slots to which the plurality of storage media are attached,
wherein said read-out unit reads out the identification information from each of the storage media attached to the plurality of slots.

13. A communication apparatus comprising:
a read-out unit configured to read out identification information from each of a plurality of storage media each storing identification information about a communication line;
a communication unit configured to determine a plurality of communication lines corresponding to the plurality of storage media based on the identification information read out from the plurality of storage media by said read-out unit, and to perform communication with a base station using one of the plurality of determined communication lines; and
a control unit configured to control said communication unit to execute a search process of searching for a communicable base station at an interval determined for each of the plurality of determined communication lines, and to set a standby state for an incoming call based on a result of the search,
wherein said control unit sets the interval of the search process to be executed by said communication unit in accordance with the number of communication lines in the standby state, and
wherein said control unit controls said communication unit to execute the search process at the set interval for a communication line, based on the identification information of the plurality of storage media, that is not set in the standby state.

14. The apparatus according to claim 13, wherein when the number of communication lines in the standby state has not reached a threshold value, said control unit sets the interval to a first interval, and when the number of communication lines in the standby state has reached the threshold value, said control unit sets the interval to a second interval longer than the first interval.

15. The apparatus according to claim 14, further comprising a setting unit configured to set the threshold value.

16. The apparatus according to claim 13, wherein said communication unit includes a plurality of communication, circuits which perform communication using different communication methods.

17. A communication apparatus comprising:
a read-out unit configured to read out identification information from each of a plurality of storage media each storing identification information about a communication line;
a communication unit configured to determine a plurality of communication lines corresponding to the plurality of storage media based on the identification information read out from the plurality of storage media by said read-out unit, and to perform communication with a base station using one of the plurality of determined communication lines; and
a control unit configured to control said communication unit to execute a search process of searching for a communicable base station at an interval determined for each of the plurality of determined communication lines, and to set a standby state for an incoming call based on a result of the search,
wherein when one of the plurality of determined communication lines is set in the standby state, said control unit prolongs the interval of the search process to be executed for a communication line that is not set in the standby state.

18. The apparatus according to claim 17, wherein the communication unit transmits voice and e-mail to the base station and receives voice and e-mail transmitted from the base station using the one of the plurality of determined communication lines.

19. The apparatus according to claim 17, further comprising a plurality of slots to which the plurality of storage media are attached,
wherein said read-out unit reads out the identification information from each of the storage media attached to the plurality of slots.

20. The apparatus according to claim 1, wherein the communication unit transmits voice and e-mail to the base station and receives voice and e-mail transmitted from the base station using the one of the plurality of determined communication lines.

21. The apparatus according to claim 13, wherein the communication unit transmits voice and e-mail to the base station and receives voice and e-mail transmitted from the base station using the one of the plurality of determined communication lines.

22. The apparatus according to claim 13, further comprising a plurality of slots to which the plurality of storage media are attached,
wherein said read-out unit reads out the identification information from each of the storage media attached to the plurality of slots.

23. A communication apparatus comprising:
a read-out unit configured to read out identification information from each of a plurality of storage media each storing identification information about a communication line;
a communication unit configured to determine a plurality of communication lines corresponding to the plurality of storage media based on the identification information read out from the plurality of storage media by said read-out unit, and to perform communication with a base station using one of the plurality of determined communication lines, said communication unit including a plurality of communication circuits which perform communication using different communication methods; and
a control unit configured to control said communication unit to execute a search process of searching for a communicable base station at an interval determined for each of the plurality of determined communication lines, and to set a standby state for an incoming call based on a result of the search,
wherein said control unit sets the interval of the search process to be executed by said communication unit in accordance with the number of communication lines in the standby state.

24. The apparatus according to claim 23, wherein when the number of communication lines in the standby state has not reached a threshold value, said control unit sets the interval to a first interval, and when the number of communication lines in the standby state has reached the threshold value, said control unit sets the interval to a second interval longer than the first interval.

25. The apparatus according to claim 23, wherein the communication unit transmits voice and e-mail to the base station and receives voice and e-mail transmitted from the base station using the one of the plurality of determined communication lines.

26. The apparatus according to claim 23, further comprising a plurality of slots to which the plurality of storage media are attached, wherein said read-out unit reads out the identification information from each of the storage media attached to the plurality of slots.

27. A control method of a communication apparatus having a communication unit, comprising:

reading out identification information from each of a plurality of storage media each storing identification information about a communication line;

determining a plurality of communication lines corresponding to the plurality of storage media based on the identification information read out from the plurality of storage media;

performing communication with a base station using one of the plurality of determined communication lines; and executing a search process of searching for a base station communicable with the communication unit at an interval determined for each of the plurality of determined communication lines, wherein the search process is executed for a communication line, of the plurality of determined communication lines, that is not set in a standby state.

28. A control method of a communication apparatus comprising:

reading out identification information from each of a plurality of storage media each storing identification information about a communication line;

determining a plurality of communication lines corresponding to the plurality of storage media based on the identification information read out from the plurality of storage media;

performing communication with a base station using one of the plurality of determined communication lines;

executing a search process of searching for a communicable base station at an interval determined for each of the plurality of determined communication lines; and setting a standby state for an incoming call based on a result of the search, wherein the interval of the search process is set in accordance with the number of communication lines in the standby state, and wherein the search process is executed at the set interval for a communication line, of the plurality of determined communication lines, that is not set in the standby state.

29. A control method of a communication apparatus comprising:

reading out identification information from each of a plurality of storage media each storing identification information about a communication line;

determining a plurality of communication lines corresponding to the plurality of storage media based on the identification information read out from the plurality of storage media;

performing communication with a base station using one of the plurality of determined communication lines;

executing a search process of searching for a communicable base station at an interval determined for each of the plurality of determined communication lines; and setting a standby state for an incoming call based on a result of the search, wherein when one of the plurality of determined communication lines is set in the standby state, the interval of the search process to be executed for a communication line that is not set in the standby state is prolonged.

30. A control method of communication apparatus having a communication unit including a plurality of communication circuits which perform communication using different communication methods, comprising:

reading out identification information from each of a plurality of storage media each storing identification information about a communication line;

determining a plurality of communication lines corresponding to the plurality of storage media based on the identification information read out from the plurality of storage media;

performing communication between the communication unit and a base station using one of the plurality of determined communication lines;

executing a search process of searching for a communicable base station at an interval determined for each of the plurality of determined communication lines; and setting a standby state for an incoming call based on a result of the search, wherein the interval of the search process is set in accordance with the number of communication lines in the standby state.

* * * * *